(12) United States Patent
Horita et al.

(10) Patent No.: US 9,792,077 B2
(45) Date of Patent: Oct. 17, 2017

(54) INFORMATION PROCESSING APPARATUS, INFORMATION PROCESSING SYSTEM, COMPUTER-READABLE NON-TRANSITORY STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventors: Jumpei Horita, Kyoto (JP); Tatsumitsu Watanabe, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 97 days.

(21) Appl. No.: 14/831,943

(22) Filed: Aug. 21, 2015

(65) Prior Publication Data
US 2016/0171255 A1   Jun. 16, 2016

(30) Foreign Application Priority Data
Dec. 16, 2014   (JP) .................................. 2014-254291

(51) Int. Cl.
*G06F 3/06* (2006.01)
(52) U.S. Cl.
CPC ............ *G06F 3/068* (2013.01); *G06F 3/0619* (2013.01); *G06F 3/0655* (2013.01)
(58) Field of Classification Search
CPC ............ G06K 19/0723; G06K 7/0008; G06K 7/10366; G06K 19/07749; G06K 7/01; G06K 7/10198; G06K 7/10297; G06K 19/0701
USPC ...................................................... 340/10.51
See application file for complete search history.

(56) References Cited

U.S. PATENT DOCUMENTS

| 7,676,401 | B2* | 3/2010 | Sawada | G06Q 20/1235 705/26.1 |
|---|---|---|---|---|
| 7,682,252 | B2* | 3/2010 | Mitsuhara | A63F 13/10 463/43 |
| 7,835,806 | B2* | 11/2010 | Bliss | G05B 19/056 700/24 |
| 9,065,438 | B2* | 6/2015 | Aoki | H03K 19/018585 |
| 2014/0256430 | A1 | 9/2014 | Matsumura | |

FOREIGN PATENT DOCUMENTS

JP      2014-171678      9/2014

* cited by examiner

*Primary Examiner* — Mark Blouin
(74) *Attorney, Agent, or Firm* — Nixon & Vanderye P.C.

(57) ABSTRACT

An example information processing apparatus which performs non-contact communication with a data storage medium having a non-contact communication function and performs predetermined information processing, acquires first data stored in a first data storage medium and second data stored in a second data storage medium by using the non-contact communication. Next, the example information processing apparatus performs information processing based on the first data and/or the second data. Then, the example information processing apparatus writes the first data into the second data storage medium or writes the second data into the first data storage medium.

21 Claims, 15 Drawing Sheets

FIG. 15
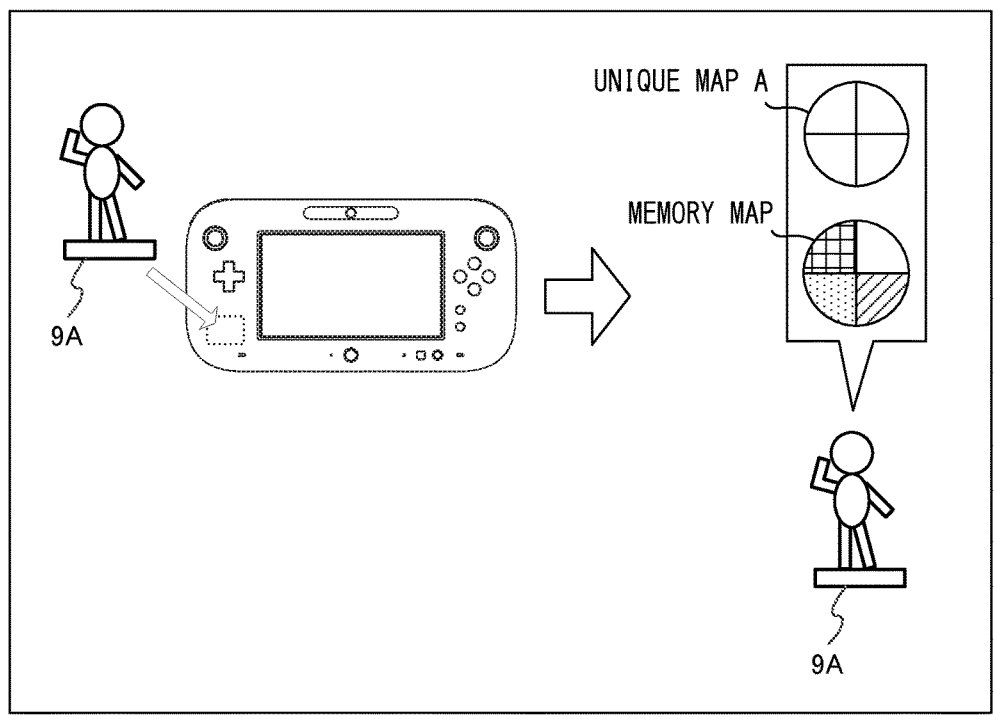
FIG. 16
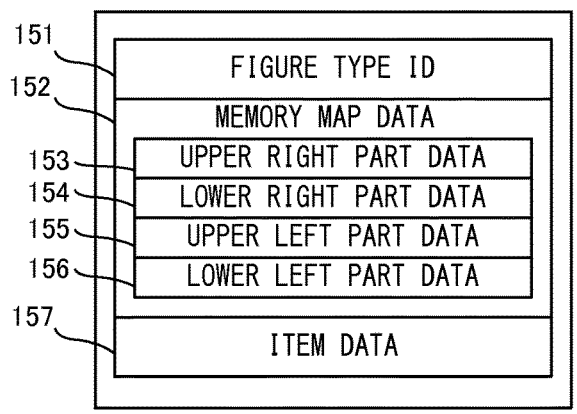
FIG. 17
| ITEM A | ITEM B | ITEM C | ... | ITEM J |
|--------|--------|--------|-----|--------|
| OFF    | ON     | ON     | ... | OFF    |

| FIGURE ID | MAP NUMBER |
|---|---|
| A01 | 1 |
| B01 | 2 |
| C01 | 3 |
| ⋮ | ⋮ |
| H01 | 8 |

203

| MAP NUMBER | UPPER RIGHT PART DATA | LOWER RIGHT PART DATA | UPPER LEFT PART DATA | LOWER LEFT PART DATA |
|---|---|---|---|---|
| 1 | ... | ... | ... | ... |
| 2 | ... | ... | ... | ... |
| 3 | ... | ... | ... | ... |
| ⋮ | ⋮ | ⋮ | ⋮ | ⋮ |
| 8 | ... | ... | ... | ... |

INFORMATION PROCESSING APPARATUS, INFORMATION PROCESSING SYSTEM, COMPUTER-READABLE NON-TRANSITORY STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2014-254291, filed on Dec. 16, 2014, is incorporated herein by reference.

FIELD

The exemplary embodiments relate to an information processing apparatus which performs non-contact communication with a data storage medium having a non-contact communication function and executes predetermined information processing.

BACKGROUND AND SUMMARY

Hitherto, information processing which performs non-contact communication with a dedicated figure including an IC tag has been known. In such a technique, data is acquired from the dedicated figure by using non-contact communication, and a character corresponding to the acquired data is displayed as a selection target for a player character on a display section.

In the above processing, status data of the character read from the dedicated figure is changed in accordance with a result of game processing, and is written back into the same dedicated figure as the figure from which the status data is read, that is, is updated.

It is a feature of the exemplary embodiments to provide an information processing apparatus and the like which is able to improve the convenience of reading and writing of data by using non-contact communication.

In order to attain the feature described above, the following configuration examples are exemplified.

A configuration example is directed to an information processing apparatus which performs non-contact communication with a data storage medium having a non-contact communication function and performs predetermined information processing. The information processing apparatus includes a non-contact communication section, a data acquisition section, an information processing section, and a data writing section. The non-contact communication section is configured to perform non-contact communication with the data storage medium. The data acquisition section is configured to acquire first data stored in a first data storage medium and second data stored in a second data storage medium by using the non-contact communication. The information processing section is configured to perform information processing based on the first data and/or the second data. The data writing section is configured to write the first data into the second data storage medium or write the second data into the first data storage medium.

According to the above configuration example, it is possible to improve the convenience of reading and writing of data by using non-contact communication.

In another configuration example, the first data storage medium and the second data storage medium may be different types of storage media. For example, the first data storage medium and the second data storage medium may be storage media which have the same communication standard for the non-contact communication but have appearances different from each other. In addition, for example, the first data storage medium and the second data storage medium may be storage media which have different communication standards for the non-contact communication.

According to the above configuration example, it is possible to improve the convenience of reading and writing of data through non-contact communication, for example, using a combination of a dedicated figure and a dedicated card or a combination of dedicated figures having different appearances.

In another configuration example, the information processing section may read the second data from the first data storage medium or may read the first data from the second data storage medium, and may perform information processing based on the read first data or the read second data. Furthermore, the information processing section may read both the first data and the second data from the first data storage medium or the second data storage medium and may perform information processing based on the read first data and second data.

According to the above configuration example, it is possible to load data stored in another storage medium, into the own possessed storage medium, and use the data, so that it is possible to improve the convenience.

In another configuration example, the data writing section may be configured to write the first data into the second data storage medium or write the second data into the first data storage medium after the predetermined information processing based on the first data and/or the second data ends.

According to the above configuration example, for example, at the timing of end of the predetermined game processing, it is possible to store a content reflecting a change in data or the like which occurs during the game processing, into the data storage medium.

In another configuration example, the data storage medium may be a media having an appearance by which a predetermined character is identifiable. Furthermore, unique data associated with the predetermined character may be stored as the first data or the second data in the data storage medium.

According to the above configuration example, it is possible to cause each storage medium to have individuality and provide enjoyment of collecting various types of storage media.

In another configuration example, the information processing section may include a third data generation section configured to combine the first data and the second data to generate third data, and the data writing section may be configured to write the third data into the first data storage medium or write the third data into the second data storage medium.

According to the above configuration example, it is possible to perform various information processing using a combination of data stored in a plurality of storage media.

In another configuration example, the processing in the data acquisition section, the information processing section, and the data writing section is performed while predetermined application processing may be performed, and the predetermined application processing may be game processing.

According to the above configuration example, since reading and writing of data by using non-contact communication are performed as a part of the application processing, it is possible to further enhance the fun, for example, in a game application.

In another configuration example, the non-contact communication may be communication using an IC tag.

According to the above configuration example, it is possible to improve the convenience in storage media which are low in cost and use a standard having a high diffusion rate.

In another configuration example, the data acquisition section may acquire, from a third data storage medium in which third data is stored, the third data, the information processing section may perform processing based on the first data, the second data, and the third data, and the data writing section may be configured to write the first data and the third data into the second data storage medium or write the second data and the third data into the first data storage medium.

According to the above configuration example, it is possible to write data acquired from other multiple data storage media, so that it is possible to further improve the convenience of reading and writing of data by using non-contact communication.

According to the present embodiment, it is possible to improve the convenience of reading and writing of data by using non-contact communication.

BRIEF DESCRIPTION OF THE DRAWINGS

FIG. 15 is a diagram for explaining a non-limiting example of a "memory map";

FIG. 16 is a diagram showing a non-limiting example of information stored in a storage section 93 of the dedicated FIG. 9;

FIG. 17 shows a non-limiting example of the configuration of item data;

DETAILED DESCRIPTION OF NON-LIMITING EXAMPLE EMBODIMENTS

Hereinafter, an exemplary embodiment will be described.

[1. Overall Configuration of Game System]

Figure 1:
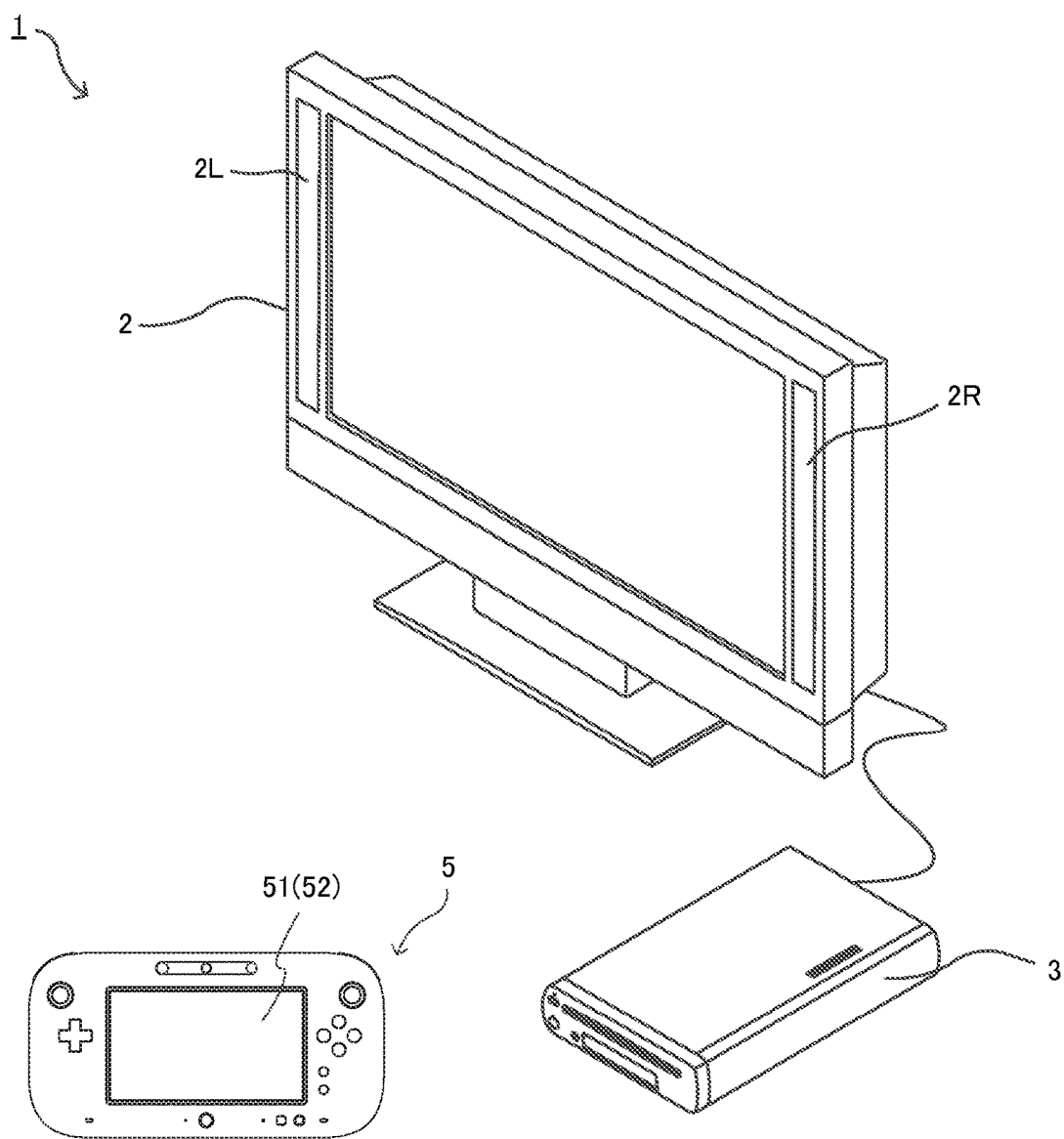
FIG. 1 is an external view of a game system 1 which is a non-limiting example of an embodiment.
Figure 1:
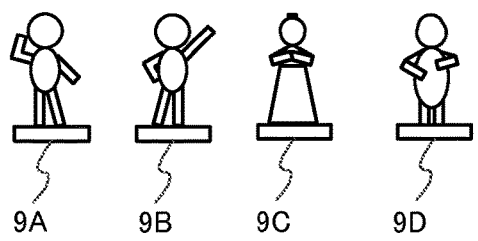

Hereinafter, a game system 1 which is an example of an information processing system according to the present embodiment will be described with reference to the drawings. FIG. 1 is an external view of the game system 1. In FIG. 1, the game system 1 includes a stationary display device (hereinafter, referred to as "television") 2 typified by, for example, a television receiver, a stationary game apparatus 3, and a terminal device 5. The game system 1 performs game processing in the game apparatus 3 on the basis of a game operation with the terminal device 5, and displays a game image obtained by the game processing, on the television 2 and/or the terminal device 5.

An optical disc (not shown) which is an example of an information storage medium replaceably used with respect to the game apparatus 3 is detachably inserted in the game apparatus 3. An information processing program (typically a game program) to be executed in the game apparatus 3 is stored in the optical disc. The game apparatus 3 has an insertion slot in a front surface thereof. The game apparatus 3 reads and executes the game program stored in the optical disc inserted in the insertion slot, thereby performing game processing.

The television 2 is connected to the game apparatus 3 via a connection cord. The television 2 displays a game image obtained by the game processing performed in the game apparatus 3. The television 2 includes speakers 2L and 2R which output a game sound obtained as a result of the game processing. It is noted that in another embodiment, the game apparatus 3 and the stationary display device may be integrated with each other. In addition, communication between the game apparatus 3 and the television 2 may be wireless communication.

The terminal device 5 is sized to be able to be held by a user, and the user can hold the terminal device 5 with their hands and move the terminal device 5 or can locate the terminal device 5 at a free position when using the terminal device 5. Although the detailed configuration of the terminal device 5 will be described later, the terminal device 5 includes an LCD (Liquid Crystal Display) 71 as display means, and input means. The terminal device 5 and the game apparatus 3 are able to communicate with each other wirelessly (may be via a wire). The terminal device 5 receives, from the game apparatus 3, data of an image (e.g., a game image) generated in the game apparatus 3, and displays the image on the LCD 51. It is noted that although the LCD is used as the display device in the present embodiment, any other display device such as a display device using an EL (Electro Luminescence), or the like may be used. In addition, the terminal device 5 transmits, to the game apparatus 3, operation data representing the content of an operation performed on the terminal device 5.

Moreover, the terminal device 5 is able to transmit and receive data to and from dedicated FIGS. 9A to 9D (hereinafter, also collectively referred to as dedicated FIG. 9) through non-contact communication.

Figure 9:
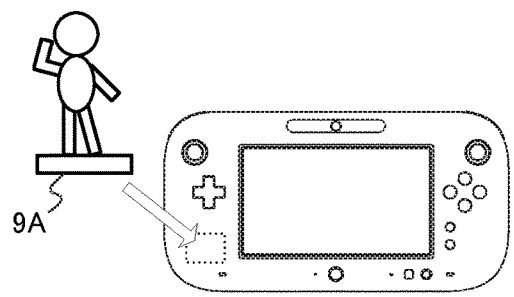
FIG. 9 is a diagram for explaining a non-limiting example of board map generation using four dedicated FIGS. 9A to 9D.

The dedicated FIG. 9 is a data storage medium to be used by the user in play of a game which is realized by executing the game program in the game apparatus 3. There are a plurality of types of dedicated FIG. 9, and it is assumed that there are eight types of FIG. 9 in the present embodiment. FIG. 1 shows four types of dedicated FIG. 9 among the eight types. In a game according to the present embodiment, a plurality of characters are prepared as player objects to be operated by users. Each dedicated FIG. 9 has a shape representing the external appearance of a character to be operated by the user in the game, and is formed of a synthetic resin or the like. A later-described IC tag 90 is embedded in the dedicated FIG. 9, and the dedicated FIG. 9 is able to perform non-contact communication with the terminal device 5. In addition, various data corresponding to the character are stored in the IC tag 90 of the dedicated FIG. 9. Under control of the game apparatus 3, the terminal device 5 is able to read data from the IC tag 90 through non-contact communication, and is able to update the data stored in the IC tag 90 or write data into the IC tag 90.

[2. Internal Configuration of Game Apparatus 3]

Figure 2:
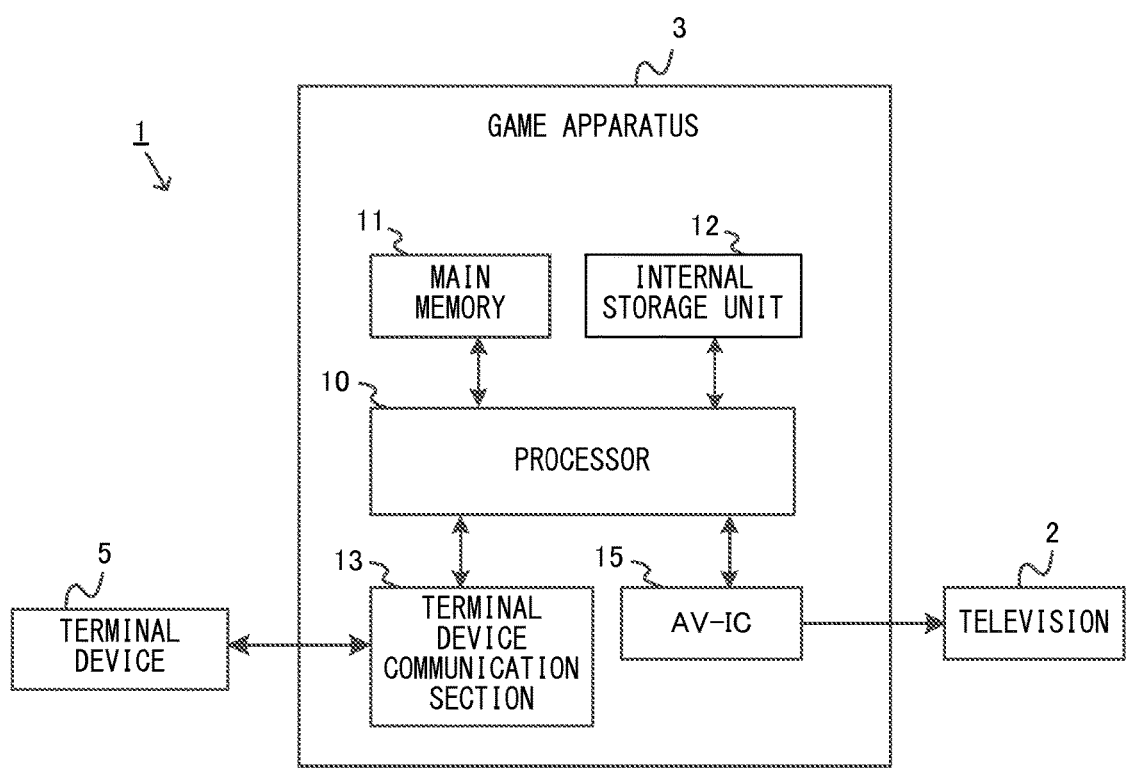
FIG. 2 is a block diagram showing a non-limiting example of the internal configuration of a game apparatus 3.

Next, the internal configuration of the game apparatus 3 will be described with reference to FIG. 2. FIG. 2 is a block diagram showing the internal configuration of the game apparatus 3. The game apparatus 3 includes a processor 10, a main memory 11, an internal storage unit 12, a terminal device communication section 13, an AV-IC 15, and the like. In addition to these, although not shown, the game apparatus 3 also includes a disc drive for reading program data, texture data, or the like from the optical disc and writing the read data into an internal main memory or the main memory 11.

The processor 10 executes a game program stored in the internal storage unit 12 or an optical disc which is not shown, thereby performing game processing. The processor 10 serves as a game processor. The processor 10 is connected to the main memory 11, the internal storage unit 12, the terminal device communication section 13, and the AV-IC 15. The volatile main memory 11 stores therein programs such as the game program read from the optical disc and the game program read from the internal storage unit 12, stores therein various data, and is used as a work area or a buffer area of the processor 10. The internal storage unit 12 is, for example, a flash memory or a hard disk drive.

Although not shown, the processor 10 includes an input/output processor (I/O processor), a GPU (Graphics Processor Unit), a DSP (Digital Signal Processor), a VRAM (Video RAM), and the internal main memory. The GPU forms a part of rendering means, and generates an image in accordance with a predetermined graphics command (image generation command). The VRAM stores data (data such as polygon data and texture data) required in order for the GPU to execute the graphics command. In generating an image, the GPU generates image data by using data stored in the VRAM.

The DSP serves as an audio processor, and generates audio data by using sound data and acoustic waveform (tone quality) data which are stored in the internal main memory or the main memory 11.

Data of an image and a sound to be outputted at the television 2, among images and sounds generated in the game apparatus 3 as described above, is read by the AV-IC 15. The AV-IC 15 outputs the read image data to the television 2, and outputs the read audio data via the AV connector to speakers 2L and 2R included in the television 2. Accordingly, the image is displayed on the television 2, and the sound is outputted from the speakers 2L and 2R.

Data of an image and a sound to be outputted at the terminal device 5, among the images and the sounds generated in the game apparatus 3, is transmitted to the terminal device 5 via the terminal device communication section 13.

The game apparatus 3 is able to transmit and receive data of images, sounds, and the like to and from the terminal device 5. When transmitting a game image (a game image for terminal) to the terminal device 5, the processor 10 performs a compression process on data of the game image generated by the GPU. The compressed image data is transmitted by the terminal device communication section 13 to the terminal device 5. In the present embodiment, image data transmitted from the game apparatus 3 to the terminal device 5 is used for a game. If an image to be displayed is delayed in the game, this has an adverse effect on the operability of the game. Thus, regarding transmission of image data from the game apparatus 3 to the terminal device 5, it is preferable that a delay occurs as little as possible. Therefore, in the present embodiment, a codec LSI 27 compresses image data by using a high-efficient compression technique such as H.264 standard. A compression technique other than this technique may be used. If a communication speed is sufficient, the game apparatus 3 may be configured to transmit image data without compressing the image data.

In addition to the image data, the game apparatus 3 also transmits audio data to the terminal device 5. That is, similarly to the image data, the processor 10 performs a compression process on audio data generated by the DSP. Then, the processor 10 transmits the compressed image data and audio data via the terminal device communication section 13 to the terminal device 5.

In addition to the image data and the audio data, the game apparatus 3 also transmits various control data to the terminal device 5 according to need.

The game apparatus 3 is able to receive various data from the terminal device 5. In the present embodiment, the terminal device 5 transmits operation data. The operation data transmitted from the terminal device 5 is received by the terminal device communication section 13. After being received by the terminal device communication section 13, the operation data is outputted to the processor 10. The processor 10 stores (temporarily stores) the data received from the terminal device 5, into the buffer area of the internal main memory or the main memory 11.

Regarding the processor 10, later-described processing may be performed by a single processor 10, or a plurality of processors 10 may be provided in the single game apparatus 3, and the processing may be performed by using the plurality of processors 10 in combination. The processor 10 may be a so-called single-core processor or multi-core processor.

[3. Configuration of Terminal Device 5]

Figure 3:
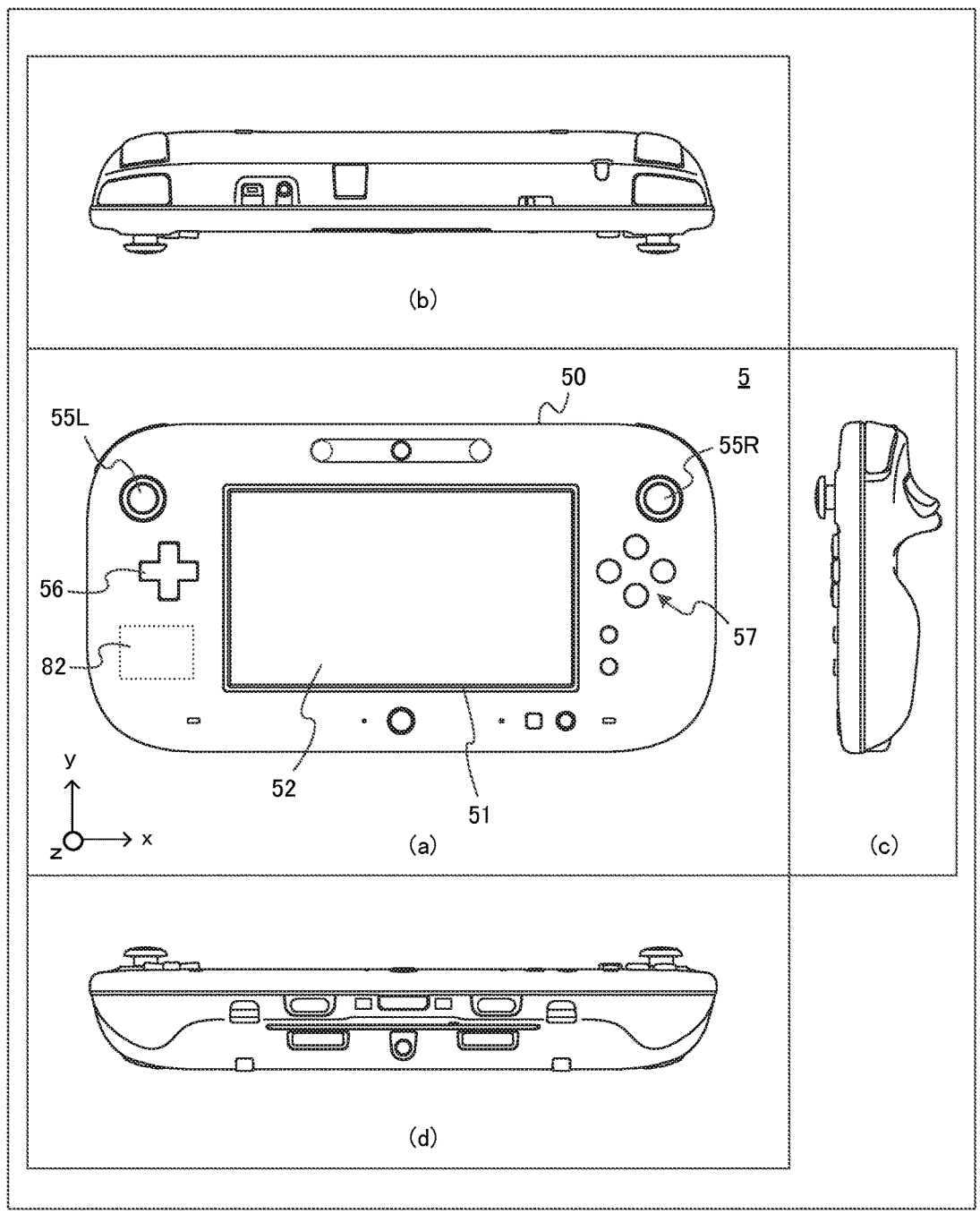
FIG. 3 is a diagram showing a non-limiting example of the external configuration of a terminal device 5.

Next, the configuration of the terminal device 5 will be described with reference to FIG. 3. FIG. 3 is a diagram showing the external configuration of the terminal device 5. In FIG. 3, (a) is a front view of the terminal device 5; (b) is a top view of the terminal device 5; (c) is a right side view of the terminal device 5; and (d) is a bottom view of the terminal device 5.

As shown in FIG. 3, the terminal device 5 includes a housing 50 which generally has a rectangular plate shape which is laterally long. The housing 50 is sized to be able to be held by the user. Therefore, the user can hold and move the terminal device 5, or can change the located position of the terminal device 5.

The terminal device 5 includes the LCD 51 on a front surface of the housing 50. The LCD 51 is provided near the center of the front surface of the housing 50. Therefore, the user can hold and move the terminal device 5 while viewing the screen of the LCD 51, by holding portions of the housing 50 at both sides of the LCD 51.

As shown in (a) of FIG. 3, the terminal device 5 includes, as operation means, a touch panel 52 on the screen of the LCD 51. Furthermore, the terminal device 5 includes, as operation means, two analog sticks 55L and 55R, a cross button 56, and a plurality of buttons 57. Each of the analog sticks 55L and 55R is a device for designating a direction. Each of the analog sticks 55L and 55R is configured such that its stick portion to be operated with a finger of the user is slidable or tiltable relative to the front surface of the housing 50 in any direction (at any angle in the up, down, left, right, and oblique directions).

Each of the cross button 56 and the operation buttons 57 is operation means for performing a predetermined input. Each of the buttons 56 and 57 is provided at a position at which the user can operate the button in a state where the user holds the left and right portions of the terminal device 5. Therefore, the user can easily operate these operation means even when holding and moving the terminal device 5. The cross button 56 is a button which has a cross shape and allows an upward, downward, leftward, or rightward direction to be designated. The four buttons 57 are provided at the right side of the LCD 51 and at the lower side of the right analog stick 55R. That is, the four buttons 57 are disposed at a position at which it is possible to operate the buttons 57 with the right hand of the user.

A later-described non-contact communication section 82 is included at a position below the cross button 56.

Regarding the terminal device 5 shown in FIG. 3, the shapes of each operation button and the housing 50, the numbers and installed positions of the respective components, and the like are merely examples, and may be other shapes, numbers, and installed positions.

[4. Internal Configuration of Terminal Device 5]

Figure 4:
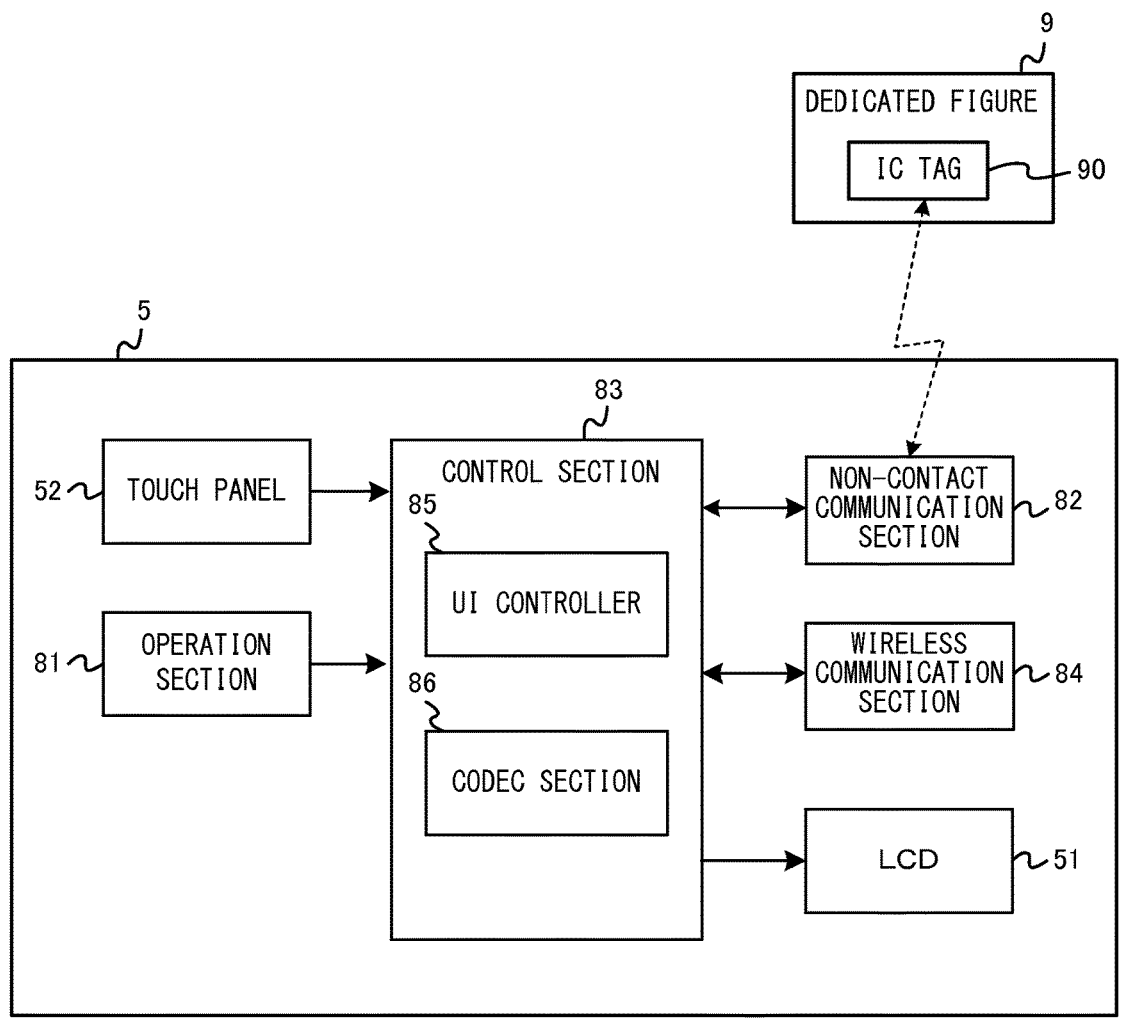
FIG. 4 is a block diagram showing a non-limiting example of the internal configuration of the terminal device 5.
Figure 6:
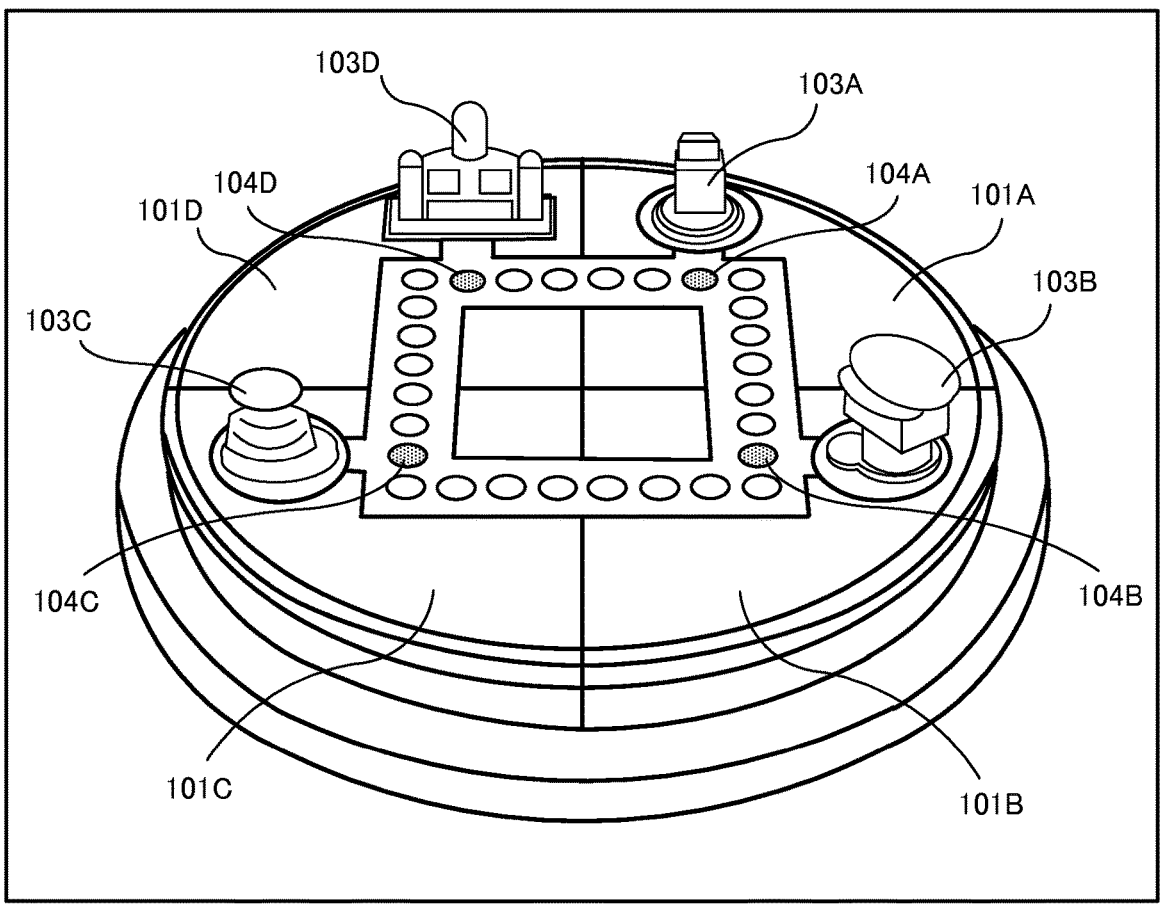
FIG. 6 is a diagram showing a non-limiting example of a game screen of game processing according to the embodiment.
Figure 7:
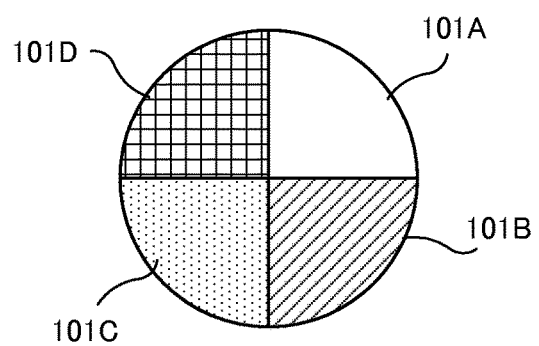
FIG. 7 is a schematic diagram showing a non-limiting configuration example of a board map.

Next, the internal configuration of the terminal device 5 will be described with reference to FIG. 6. FIG. 4 is a block diagram showing the internal configuration of the terminal device 5. As shown in FIG. 4, in addition to the LCD 51, the touch panel 52, the analog sticks 55L and 55R, the cross button 56, and an operation section 81 corresponding to the plurality of buttons 57, which are shown in FIG. 3, the terminal device 5 includes the non-contact communication section 82, a control section 83, a wireless communication section 84, and the like. These electronic components are mounted on an electronic circuit substrate and accommodated in the housing 50.

The control section 83 includes a UI controller 85, a codec section 86, and the like. The UI controller 85 controls input and output of data to and from various input/output sections. The codec section 86 performs a compression process on data to be transmitted to the game apparatus 3, and performs a decompression process on data transmitted from the game apparatus 3. The control section 83 transmits operation data acquired from the touch panel 52 and the operation section 81 (the analog sticks 55L and 55R, the cross button 56, the plurality of buttons 57, etc.), or dedicated figure data (described later) acquired from the non-contact communication section 82, as terminal operation data via the wireless communication section 84 to the game apparatus 3. In addition, as described above, compressed image data and compressed audio data are transmitted from the game apparatus 3 to the terminal device 5. These data is transmitted via the wireless communication section 84 to the control section 83. The control section 83 (the codec section 86 thereof) decompresses received image data and audio data. The decompressed image data is outputted to the LCD 51, and an image based on the image data is displayed on the LCD 51. In addition, the decompressed audio data is outputted to a sound IC (not shown), and the sound IC causes a sound, based on the audio data, to be outputted from a speaker (not shown).

The non-contact communication section 82 performs non-contact data transmission and reception through wireless communication with the dedicated FIG. 9 according to a communication standard such as ISO/IEC18092 (so-called NFC), or the like. The communication range is about several centimeters to several meters. The non-contact communication section 82 transmits, to the IC tag 90 embedded in the dedicated FIG. 9 described later, a signal which instructs reading of data stored therein, and receives desired data as a response to the signal. The non-contact communication section 82 has a function of a so called reader for IC tag. In addition, the non-contact communication section 82 is able to perform writing of data into the IC tag 90 by transmitting a signal, which instructs writing, together with data to be written. That is, the non-contact communication section 82 has a function of a writer for IC tag. However, the communication method by the non-contact communication section 82 is not limited to NFC, but may be various communication methods used as non-contact communication, short-range wireless communication, or the like, such as RFID.

[5. Internal Configuration of Dedicated FIG. 9]

Figure 5:
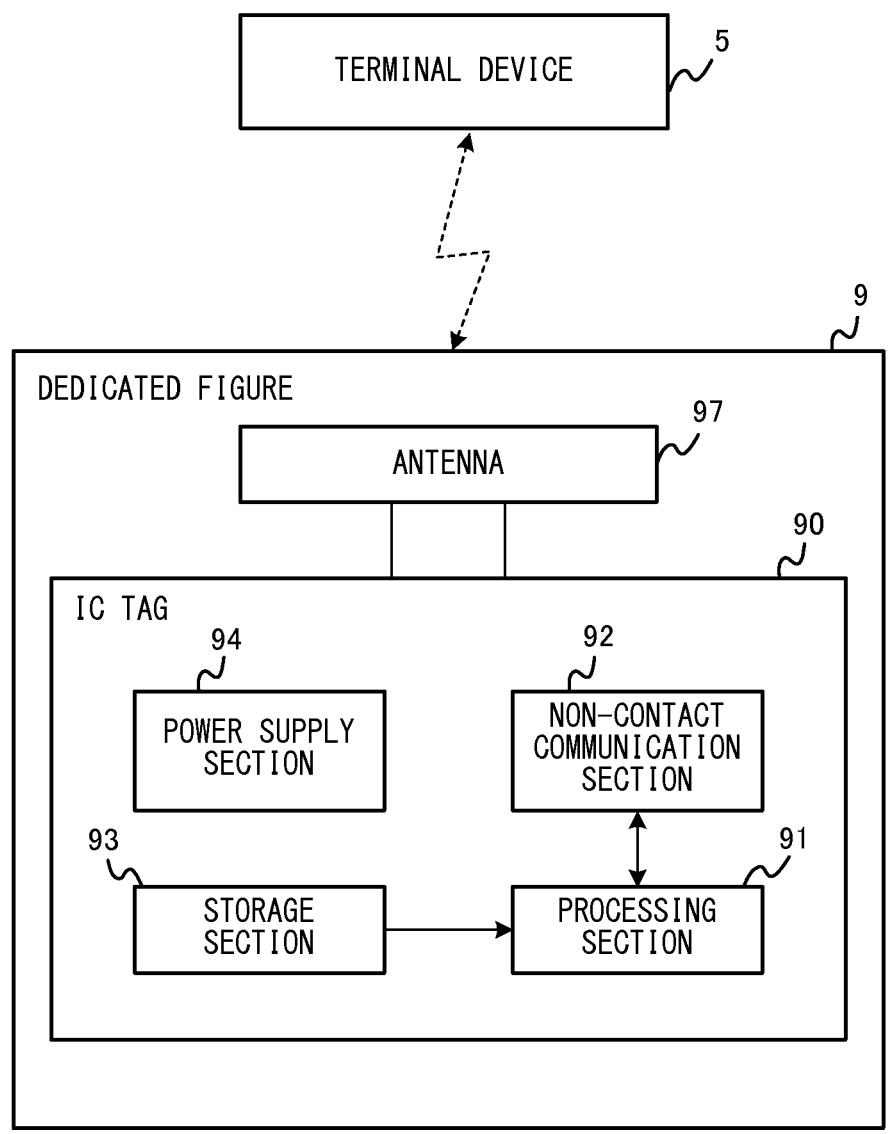
FIG. 5 is a block diagram showing a non-limiting example of the internal configuration of a dedicated FIG. 9.

Next, the internal configuration of the dedicated FIG. 9 will be described with reference to FIG. 5. FIG. 5 is a block diagram showing the internal configuration of the dedicated FIG. 9. The dedicated FIG. 9 according to the present embodiment is a data storage medium configured with the IC tag 90 and an antenna 97 which are embedded within a molded body formed of a synthetic resin or the like. The antenna 97 can be configured such that a metal wire is disposed within the dedicated FIG. 9 in a spiral shape and both ends of the metal wire are connected to the IC tag 90. The IC tag 90 is provided as a single IC chip, and includes a processing section 91, a non-contact communication section 92, a storage section 93, a power supply section 94, and the like.

The IC tag 90 does not include a power source such as a battery, and operates by an electromotive force generated by electromagnetic induction when the antenna 97 receives a radio signal from the terminal device 5. The IC tag 90 is a so-called passive type tag. The power supply section 94 supplies power to the processing section 91, the non-contact communication section 92, the storage section 93, and the like within the IC tag 90 on the basis of the electromotive force, whereby each section is operated. In the present embodiment, the IC tag 90 is of a passive type, but may be of an active type.

The non-contact communication section 92 of the IC tag 90 receives, at the antenna 97, a signal transmitted from the terminal device 5, transmits data related to the received signal to the processing section 91, and transmits data provided from the processing section 91, via the antenna 57 to the terminal device 5. The storage section 93 is composed of a data-rewritable nonvolatile memory element, and has stored therein identification data assigned individually to the IC tag 90 and some data to be used in processing according to the present embodiment (the details will be described later). The processing section 91 reads data from the storage section 93 in accordance with data provided from the non-contact communication section 92, and provides the read data to the non-contact communication section 92 in order that the read data is transmitted to the terminal device 5. In addition, the processing section 91 performs data writing into the storage section 93 in accordance with the data provided from the non-contact communication section 92.

[6. Operation Outline of Information Processing According to Present Embodiment]

Next, an operation outline of information processing performed in the information processing system according to the present embodiment. In the present embodiment, a process of reading data stored in a certain storage medium by using the above-described non-contact communication and writing the data into another storage medium by using NFC, is performed. Specifically, for example, a process of reading data stored in the above-described dedicated FIG. 9A by using NFC and writing the data into the dedicated FIG. 9B by using NFC, is performed. Then, in performing processing using the dedicated FIG. 9B, it is made possible to also use the data acquired from the dedicated FIG. 9A. Thus, data recorded in another storage medium is allowed to be brought into a storage medium using NFC, and it is possible to improve the convenience of reading and writing of data by using non-contact communication.

As an example of the information processing described above, party game processing is assumed in the present embodiment. Specifically, board game processing with which maximum 4 people can play is assumed. FIG. 6 shows an example of a game screen in the present embodiment. FIG. 6 shows a circular board map which is a stage for the board game. On the board map, a plurality of circular spaces are drawn on a substantially square path. In addition, a game piece corresponding to each player (although not shown, an image representing the appearance of the above-described dedicated figure is used as a game piece) is also located on the space. Then, each player performs an operation of throwing a dice, or the like, and moves the game piece forward, thereby trying to achieve a clearing condition (regarding an operation of each player, the terminal device 5 may be used, or each player may operate another game controller which is not shown).

Here, the board map consists of four parts, that is, an upper right part 101A, a lower right part 101B, a lower left part 101C, and an upper left part 101D (a map configuration seen when looking down upon the map is shown as a schematic diagram). In addition, event objects 103A and 103D are present on the respective parts. Each of the event objects 103A and 103D has an appearance representing a building. If the game piece of the player stops at any one of event spaces 104A to 104D which are spaces nearest to the respective event objects, a representation is displayed in which the game piece enters the event object. Thereafter, the screen shifts to a predetermined screen, and an event process corresponding to each event object is performed as appropriate. The content of the event is, for example, a process in which an item in the game can be bought at a so-called "shop", or playing a mini game in a "casino". It is noted that the event contents and the appearances of the event objects 103A and 103D are different from each other.

Figure 8:
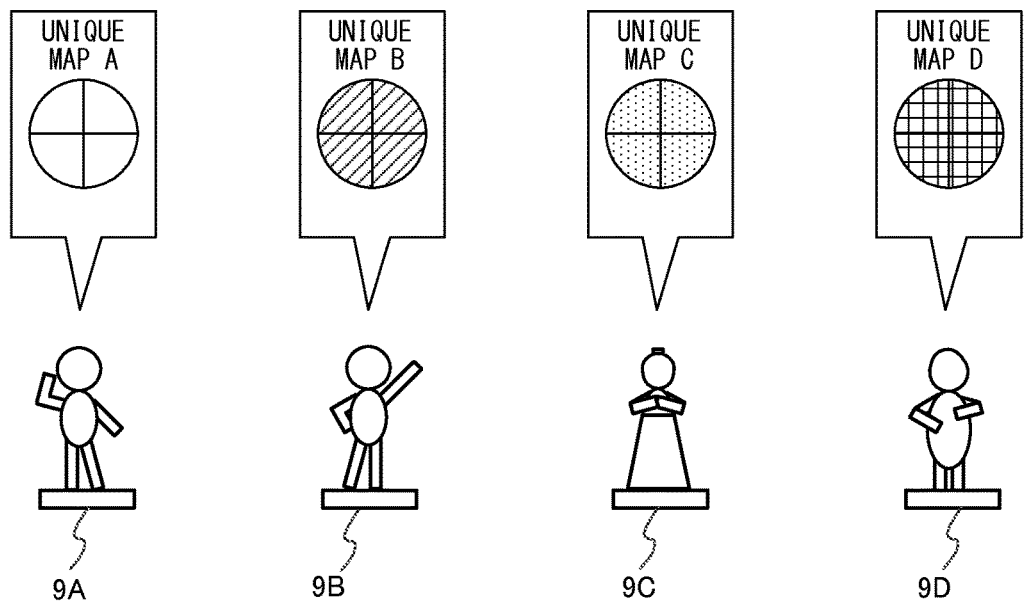
FIG. 8 is a schematic diagram showing a non-limiting example of a concept of a relationship between each dedicated figure and a board map unique thereto.

Meanwhile, in the present embodiment, when the game is played, the above-described dedicated figures can be used. In the present embodiment, the case is assumed in which four players respectively possess the dedicated FIGS. 9A to 9D different from each other. As described above, the dedicated FIG. 9 also has a function as a storage medium. Each of the dedicated FIGS. 9A to 9D has stored therein data indicating a board map unique thereto (hereinafter, also referred to as unique map). FIG. 8 is a schematic diagram showing a concept of a relationship between each figure and the unique board map stored therein. FIG. 8 shows that (data indicating) a unique map A is stored in the FIG. 9A. Similarly, FIG. 8 shows that (data indicating) a unique map B is stored in the FIG. 9B; (data indicating) a unique map C is stored in the FIG. 9C; and (data indicating) a unique map D is stored in the FIG. 9D. The difference among these unique maps is, for example, that image contents to be displayed (objects to be located, etc.) are different, and that the event objects are unique to the respective unique maps. In game processing according to the present embodiment (for example, in a map setting screen described later), by causing the dedicated FIG. 9 to get close to the non-contact communication section 82 so that the data is read, it is possible to select and play with a board map corresponding to this dedicated figure.

Furthermore, by reading the data in the four dedicated FIGS. 9A to 9D, it is possible to generate and play with a board map obtained by combining the respective unique maps. An example of board map generation using the four dedicated FIGS. 9A to 9D will be described with reference to FIGS. 9 to 12. First, a predetermined screen (e.g., a screen for map setting) is displayed, and a message which prompts each player to touch the lower left portion of the terminal device 5 with the dedicated FIG. 9, is displayed. As shown in FIG. 9, when the player who possesses the dedicated FIG. 9A (hereinafter, a player A) touches the terminal device 5 (a location where there is the non-contact communication section 82) with the dedicated FIG. 9A in response to this, the data stored in the dedicated FIG. 9A is read. Then, the unique map A is specified on the basis of the data, and a board map is generated on the basis of the unique map A. At that time, all the four parts constituting the board map are those of the unique map A.

Figure 10:
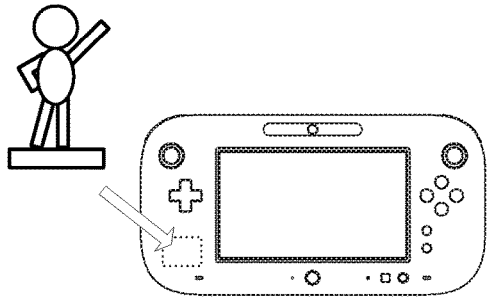
FIG. 10 is a diagram for explaining the non-limiting example of board map generation using the four dedicated FIGS. 9A to 9D.
Figure 10:
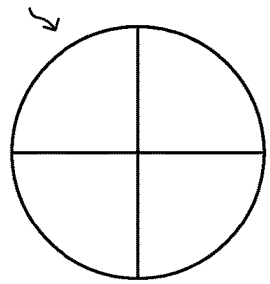
Figure 10:
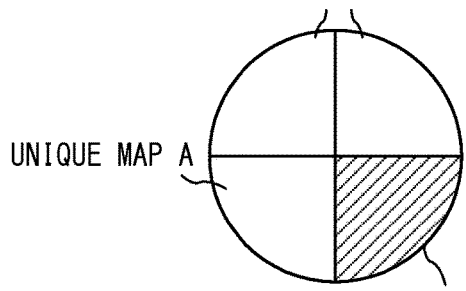
Figure 11:
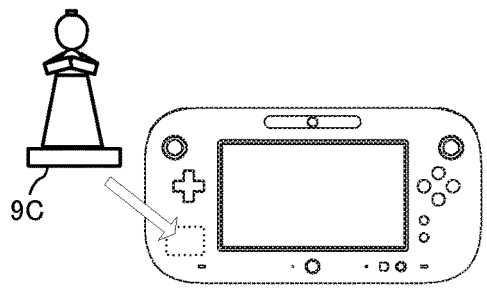
FIG. 11 is a diagram for explaining the non-limiting example of board map generation using the four dedicated FIGS. 9A to 9D.
Figure 12:
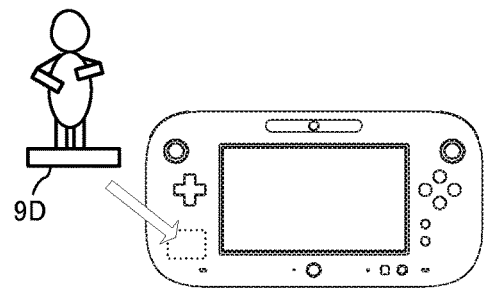
FIG. 12 is a diagram for explaining the non-limiting example of board map generation using the four dedicated FIGS. 9A to 9D.
Figure 12:
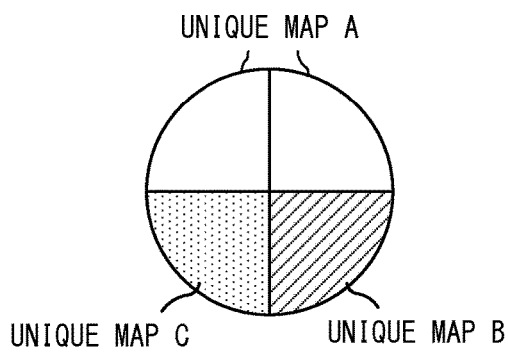
Figure 12:
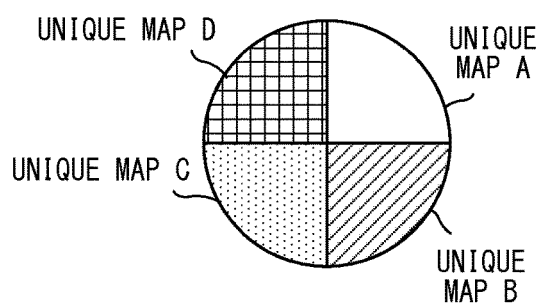

Next, as shown in FIG. 10, when the player who possesses the dedicated FIG. 9B (hereinafter, a player B) touches the terminal device 5 with the dedicated FIG. 9B, the data stored in the dedicated FIG. 9B is read. As a result, the lower right part of the board map is replaced with that of the unique map B. Subsequently, as shown in FIG. 11, when the player who possesses the dedicated FIG. 9C (hereinafter, a player C) touches the terminal device 5 with the dedicated FIG. 9C, the data stored in the dedicated FIG. 9C is read. As a result, the lower left part of the board map is replaced with that of the unique map C. Finally, as shown in FIG. 12, when the player who possesses the dedicated FIG. 9D (hereinafter, a player D) touches the terminal device 5 with the dedicated FIG. 9D, the data stored in the dedicated FIG. 9D is read. As a result, the upper left part of the board map is replaced with that of the unique map D. In this manner, by reading the data in the four dedicated FIGS. 9A to 9D, it is possible to generate a board map having a map pattern obtained by combining the unique maps A to D.

Figure 13:
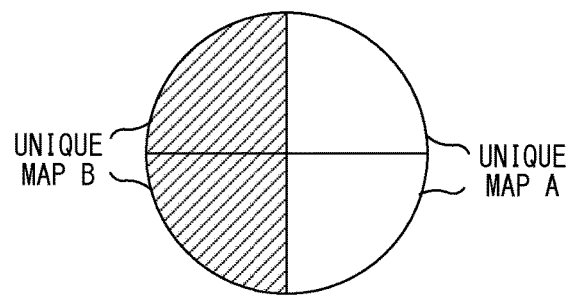
FIG. 13 shows a non-limiting example of the configuration of a board map.
Figure 14:
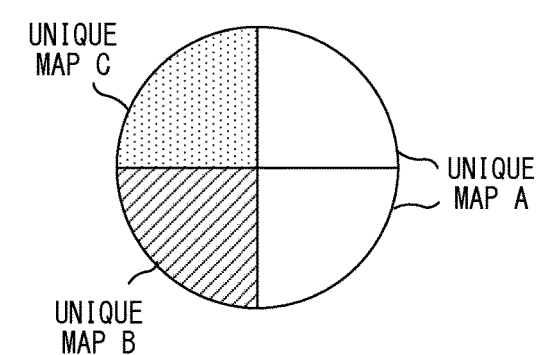
FIG. 14 shows a non-limiting example of the configuration of a board map.

Here, the case where the number of players who participate in the game is four is taken as an example. In the case where the number of participants is two, a board map may be generated so as to be configured such that finally, the right half of the board map is that of the unique map A and the left half of the board map is that of the unique map B as shown in FIG. 13. In the case where the number of participants is three, a board map may be generated so as to be configured such that the right half of the board map is that of the unique map A, the lower left part of the board ma is that of the unique map B, and the upper left part of the board map is that of the unique map C as shown in FIG. 14. These arrangement examples are examples, and the board map may have any arrangement regarding which of the read unique maps is arranged in which of the four parts.

In the present embodiment, all the dedicated FIG. 9 whose data is to be read are figures different from each other. When the dedicated figure whose data has already been read is touched again, a message indicating the data has already been read is displayed.

As described above, by reading the plurality of dedicated FIG. 9, it is possible to generate a board map having a map pattern obtained by combining the plurality of unique maps, and the players are allowed to play with the board map. In the present embodiment, it is possible to write the played board map as a "memory map" into the dedicated FIG. 9. For example, when play with the board map ends (all the participants meet a goal condition, or predetermined turns have elapsed, etc.), a message which prompts each player to touch the terminal device 5 with the dedicated FIG. 9 is displayed while a process at the time of end, for example, an announcement of a final result (ranking), is performed. Then, for example, when the player A touches the terminal device 5 with the dedicated FIG. 9A as shown in FIG. 15, the board map played at that time (to be exact, data indicating the map pattern thereof) is written as "memory map" into the dedicated FIG. 9A. As a result, the dedicated FIG. 9A comes into a state where the "memory map" is stored in addition to the unique map A.

Such a "memory map" is used as follows. For example, a place where the above-described four players gather and play is assumed to be the house of the player C. Then, the case is considered in which the player A returns home and plays the above party game with the game apparatus 3 present in the house of the player A. In this case, by causing the data in the dedicated FIG. 9A to be read, the player A can play with the above "memory map" by using the game apparatus 3 present in the house of the player A. The "memory map" can be used even for single-person play. In addition, for example, the player A has a brother who possesses a FIG. 9E, and can play with the "memory map" in multi-player play together with his/her brother. That is, by using the "memory map", the player A can play with the board map having the map pattern which is a map pattern with which play originally cannot be performed without the dedicated figures B to D. In other words, it is possible to use the data stored in the dedicated figures B to D which are not possessed by the player A.

Next, an example of exchange of item data between the dedicated FIG. 9 will be described as another example of the process of reading and writing of data by using non-contact communication between the dedicated FIG. 9 as described above.

In the game according to the present embodiment, a plurality of types of items for advantageously advancing the game are prepared. In the game, prior to start of play with the board map, each player can select one from among items possessed by the player, and can use the item only once during play. For example, the number of types of items is 10. Among the 10 types, the player A possesses only three types, an item A, an item B, and an item C. Specifically, item data indicating a possession state of such items is stored in the dedicated figure A. In addition, the item data is read and temporarily stored into the game apparatus 3. Then, at start of playing the game, a message or the like which prompts each player to "select an item to be used" is displayed as appropriate, and the player A can select any one from among the items A, B and C. Here, the player A selects the item A. Thereafter, game play is started, and the case is assumed in which the item A moves from the player A to the player B during the play. This case arises, for example, as follows. First, when the player A uses the item A, a medal indicating the item A is displayed at this timing on a space where the game piece of the player A is present at that time. Thereafter, the game piece of the player A moves forward, and the game piece of the player B comes to this space. At that time, the game piece of the player B can "pick up" the medal. As a result, the game piece of the player B can obtain the item A. In addition, for example, it is also conceivable that as a result of a predetermined event process, a process is performed in which the item A moves from the player A to the player B.

A state of movement of the item between the players which occurs during play is temporarily stored in the game apparatus 3, and data reflecting the state of movement is written into the dedicated FIG. 9 of each player. As a result, (data of) the item A stored in the dedicated FIG. 9A is written into the dedicated FIG. 9B. In this case, the data of the item A in the dedicated FIG. 9A from which the item A has moved may be stored as it is, or may be rewritten as a "non-possessed" state.

As described above, in the present embodiment, since the configuration is provided such that data stored in a certain dedicated FIG. 9 can be read and written into another dedicated figure by using non-contact communication, it is possible to improve the convenience of reading and writing of data by using non-contact communication.

[7. Details of Information Processing According to Present Embodiment]

Next, the game processing according to the present embodiment will be described in more detail with reference to FIGS. 16 to 25.

FIG. 16 shows an example of data stored in the storage section 93 of the dedicated FIG. 9 (hereinafter, also referred to as dedicated figure data). In the storage section 93, a figure type ID 151, memory map data 152, and item data 157 are stored.

The figure type ID 151 is an ID for identifying the dedicated FIG. 9 in the game apparatus 3. The game apparatus 3 can identify the above unique map corresponding to the dedicated figure, on the basis of the figure type ID 151. In other words, the figure type ID 151 can be considered as data indicating the above unique map.

The memory map data 152 is data indicating the above-described "memory map". The memory map data 152 includes upper right part data 153, lower right part data 154, upper left part data 155, and lower left part data 156. These data are data corresponding to the four parts constituting the above-described board map. In addition, the figure type ID 151 is stored as a content of these data. For example, if the upper right part of the memory map is that of the unique map A, that is, that of the unique map corresponding to the dedicated FIG. 9A, the figure type ID 151 indicating the dedicated FIG. 9A is stored. In the present embodiment, the number of memory maps that can be stored in the dedicated FIG. 9 is only one, and the memory map is overwritten in writing at the time of end of the above-described play.

The item data 157 is data for indicating a possession state of an item that can be used in the above-described game. In the present embodiment, whether the item is possessed (obtained) is indicated by ON/OFF of a flag. FIG. 17 shows an example of the configuration of the item data 157. Here, there are 10 types of items (items A to J). Regarding a possession state of each item, ON indicates that the item is possessed, and OFF indicates that the item is not possessed.

In addition, although not shown, identification data for individually identifying the IC tag 90 is also stored in the storage section 93.

Figures 18, 19, 20:
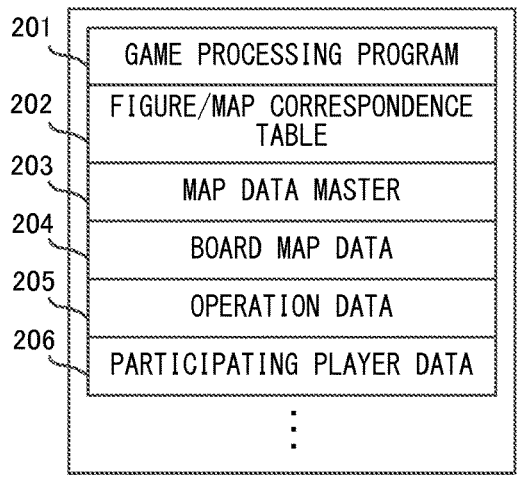
FIG. 18 is a diagram showing a non-limiting example of a program and information stored in a main memory 11 of the game apparatus 3.
FIG. 19 shows a non-limiting example of the configuration of a figure/map correspondence table 202.
FIG. 20 shows a non-limiting example of the configuration of a map data master 203.

Next, a program and data stored in the game apparatus 3 will be described. FIG. 18 shows a program and data stored in the main memory 11 of the game apparatus 3. In the main memory 11, a game processing program 201, a figure/map correspondence table 202, a map data master 203, board map data 204, operation data 205, participating player data 206, and the like are stored.

The game processing program 201 is a program for performing the above-described game processing. Specifically, the game processing program 201 is a program for performing a process in a flowchart of FIG. 21 described later.

The figure/map correspondence table 202 is data which defines a correspondence relationship between the dedicated figure and the unique map. FIG. 19 shows an example of the configuration of the figure/map correspondence table 202. In this table, a figure ID 2021 and a map number 2022 are stored so as to be associated with each other. The figure ID 2021 indicates any one figure type ID 151 stored in the storage sections 93 of the dedicated FIG. 9. The map number 2022 indicates any one map number 2031 in the map data master 203 described later.

Referring back to FIG. 18, the map data master 203 is data for configuring the above-described unique map. FIG. 20 is a diagram showing an example of the configuration of the map data master 203. The map data master 203 is data including the map number 2031, upper right part data 2032, lower right part data 2033, upper left part data 2034, and lower left part data 2035. The map number 2031 is data for uniquely identifying the above-described unique map. The upper right part data 2032, the lower right part data 2033, the upper left part data 2034, and the lower left part data 2035 are data indicating the contents of the respective four parts constituting the above-described board map. Specifically, each of the upper right part data 2032, the lower right part data 2033, the upper left part data 2034, and the lower left part data 2035 is various object and image data constituting the part, and is data indicating an event content or the like at the above-described event object 103 on the part. Although not shown, the map data master 203 includes map data of a "trial map" and the like in addition to the above-described unique data. The "trial map" is a map with which play can be performed without reading the data in the above-described dedicated FIG. 9.

Referring back to FIG. 18, the board map data 204 is data for indicating a board map to be actually used for play. The data has the same configuration as that of the memory map data 152, and includes four pieces of data, that is, upper right part data, lower right part data, lower left part data, and upper left part data. For example, the data of the map number 2022 is stored as the content of each data. In other words, the board map data 204 can be data indicating a combination (map pattern) of the map numbers 2022. For example, when the data in the above-described four dedicated FIG. 9 are read, the values of the map numbers 2022 indicating the unique maps corresponding to these dedicated FIG. 9 are stored as appropriate.

The operation data 205 is data indicating various operations performed on the terminal device 5. The operation data 205 includes data indicating the contents of operations performed on the analog sticks 55L and 55R, the operation buttons 56 and 57, and the touch panel 52. In addition, when the data in the dedicated FIG. 9 is read by the non-contact communication section 82 (when an operation of causing the dedicated FIG. 9 to get close to the non-contact communication section 82 is performed), the read data (i.e., the data stored in the dedicated FIG. 9) is also included.

The participating player data 206 is data regarding the players who participate in the game play. A data area for the number of the participants is ensured as appropriate, and various data corresponding to each player is stored therein. The data includes data read from the dedicated FIG. 9 of each participating player (e.g., the dedicated figure data shown in FIG. 16 is copied as it is). When the possession state of the item changes during game play, the item data read from the dedicated FIG. 9 is updated as appropriate. In addition, data indicating a state of each player on the game during the game is also stored as appropriate.

In addition, although not shown, for example, image data indicating the game piece of each player (an image whose appearance is the same as the dedicated FIG. 9) and various data to be used in the game processing are also stored in the main memory 11 as appropriate.

Figure 21:
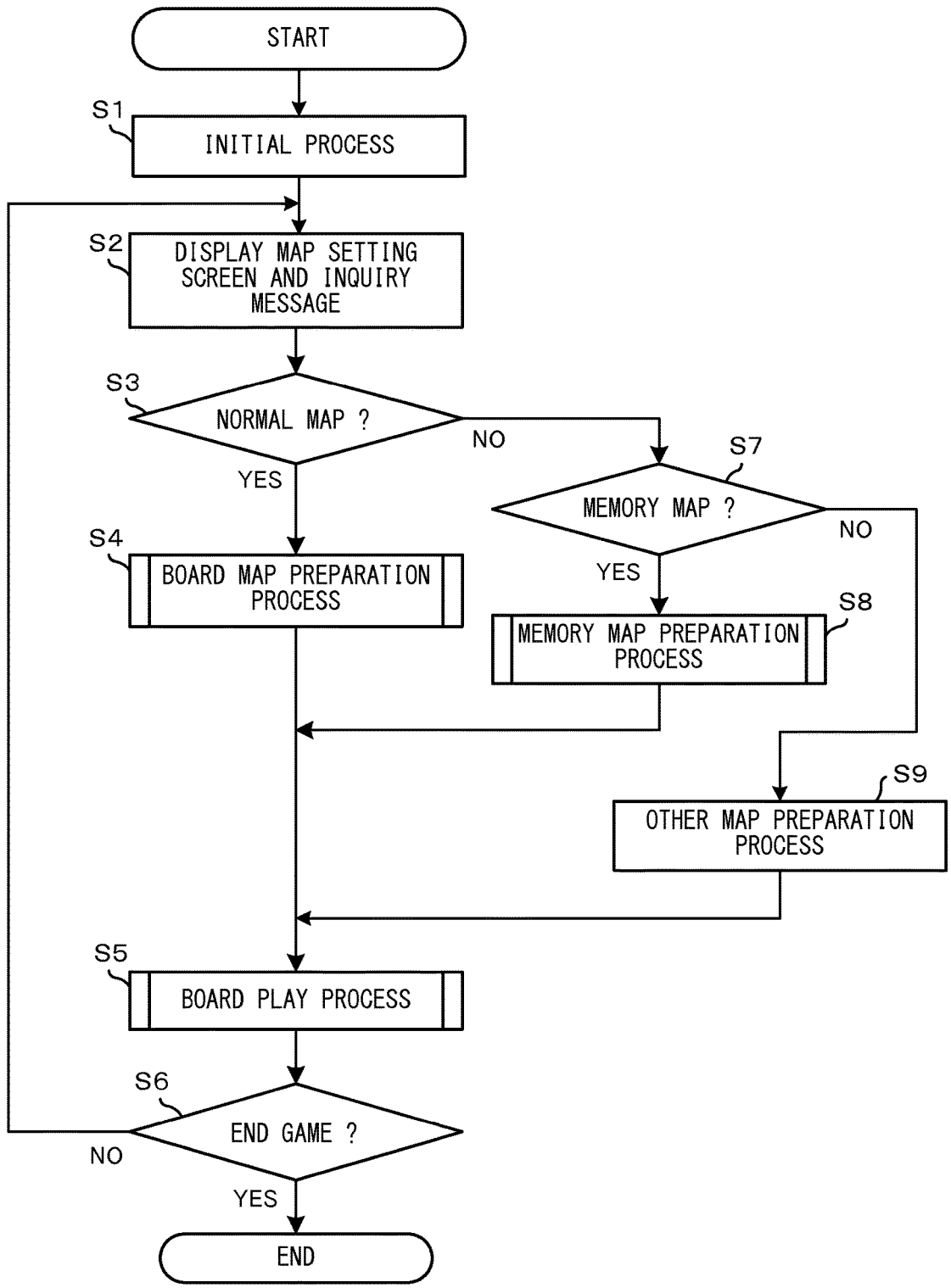
FIG. 21 is a flowchart showing details of a non-limiting example of the game processing according to the embodiment.

Next, flow of processing performed by the processor 10 of the game apparatus 3 will be described with reference to flowcharts in FIGS. 21 to 25. FIG. 21 is a flowchart showing details of the game processing according to the present embodiment.

When the game processing is started, the processor 10 performs an initial process in step S1 at first. In this process, various data to be used in the game processing are initialized.

Next, in step S2, the processor 10 displays a screen (the map setting screen) which prompts setting of a board map, and displays a message which inquires about which map is used for play. In response to this, the player can select any one of a "normal map", the "memory map", and another map (e.g., the trial map, etc.).

Next, in step S3, the processor 10 refers to the operation data 205 and determines whether the "normal map" has been selected. As a result, if the "normal map" has been selected (YES in step S3), the processor 10 performs a board map preparation process in step S4. This process is a process for reading the data in the dedicated FIG. 9 and generating a board map as described above.

Figure 22:
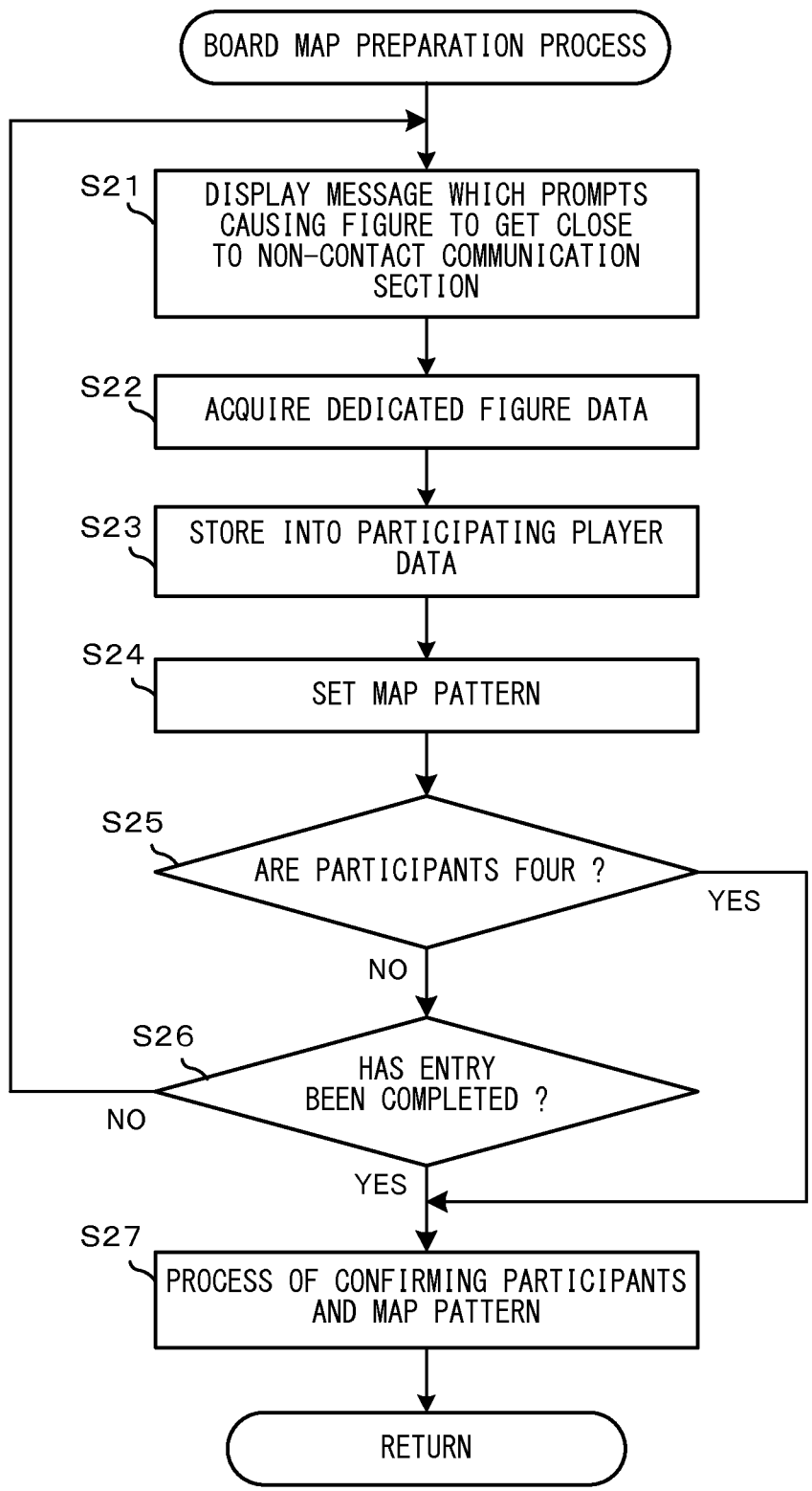
FIG. 22 is a flowchart showing details of a non-limiting example of a board map preparation process regarding step S4 in FIG. 21.

FIG. 22 is a flowchart showing details of the board map preparation process. First, in step S21, the processor 10 displays a message which prompts entry of participants and causing the dedicated FIG. 9 possessed by each participating player to get close to the terminal device 5 (the lower left portion thereof, i.e., the location where there is the non-contact communication section 82).

When each participating player causes the dedicated FIG. 9 to get close to the terminal device 5, a process of reading data is performed by the non-contact communication section 82, this data is included in the operation data 205, and the operation data 205 is transmitted to the game apparatus 3. The processor 10 refers to the operation data 205 to acquire the dedicated figure data (see FIG. 16) in step S22, and stores the dedicated figure data as a part of the participating player data 206 into the main memory 11 in step S23. In addition, in this case, an image presenting the appearance of the dedicated FIG. 9 whose data has been read is generated as a game piece for the player as appropriate.

Next, in step S24, the processor 10 sets a board map on the basis of the acquired dedicated figure data. Specifically, the processor 10 determines how manieth participating player is the current process target player. If the target player is the first player, the processor 10 specifies the map number 2022 by using the figure/map correspondence table 202 and the figure type ID 151 included in the acquired dedicated figure data. Then, the processor 10 refers to the map data master 203 and uses the map number 2022 to acquire map data (image data, etc.) of the unique map corresponding to the acquired dedicated figure data. Then, the processor 10 sets the acquired map data for all the parts of the board map data 204 (at this point of time, all the four parts of the board map data 204 have the same map number). On the other hand, if the target player is the second player, the processor 10 updates the data of the lower right part of the board map data 204 with the data of (the lower right part of) the unique map acquired from the acquired dedicated figure data. Similarly, if the target player is the third player, the processor 10 updates the data of the lower left part of the board map data 204 with the data of (the lower left part of) the unique map acquired from the acquired dedicated figure data; and if the target player is the fourth player, the processor 10 updates the data of the upper left part of the board map data 204 with the data of (the upper left part of) the unique map acquired from the acquired dedicated figure data. In this process, an image of the board map may be displayed on the screen, and a state where the board map is partially changed each time the data in the dedicated FIG. 9 is read may be displayed.

Next, in step S25, the processor 10 determines whether the participants are four. As a result, if the participants are less than four (NO in step S25), the processor 10 refers to the operation data 205 and determines whether an operation of completing participant entry has been performed in step S26. As a result, if the operation of completing has not been performed (NO in step S26), the processor 10 returns to step S21 to repeat the processes. On the other hand, if the operation of completing has been performed (YES in step S26, that is, corresponding to the case where three or fewer players play), the processor 10 performs a process for confirming the participating players and the content of the board map (e.g., displays a screen indicating completion of entry) in step S27. In addition, if it is determined that the participants are four in step S25 (YES in step S25), the processor 10 skips the process in step S26 and proceed to the process in step S27. This is the end of the board map preparation process.

Figure 23:
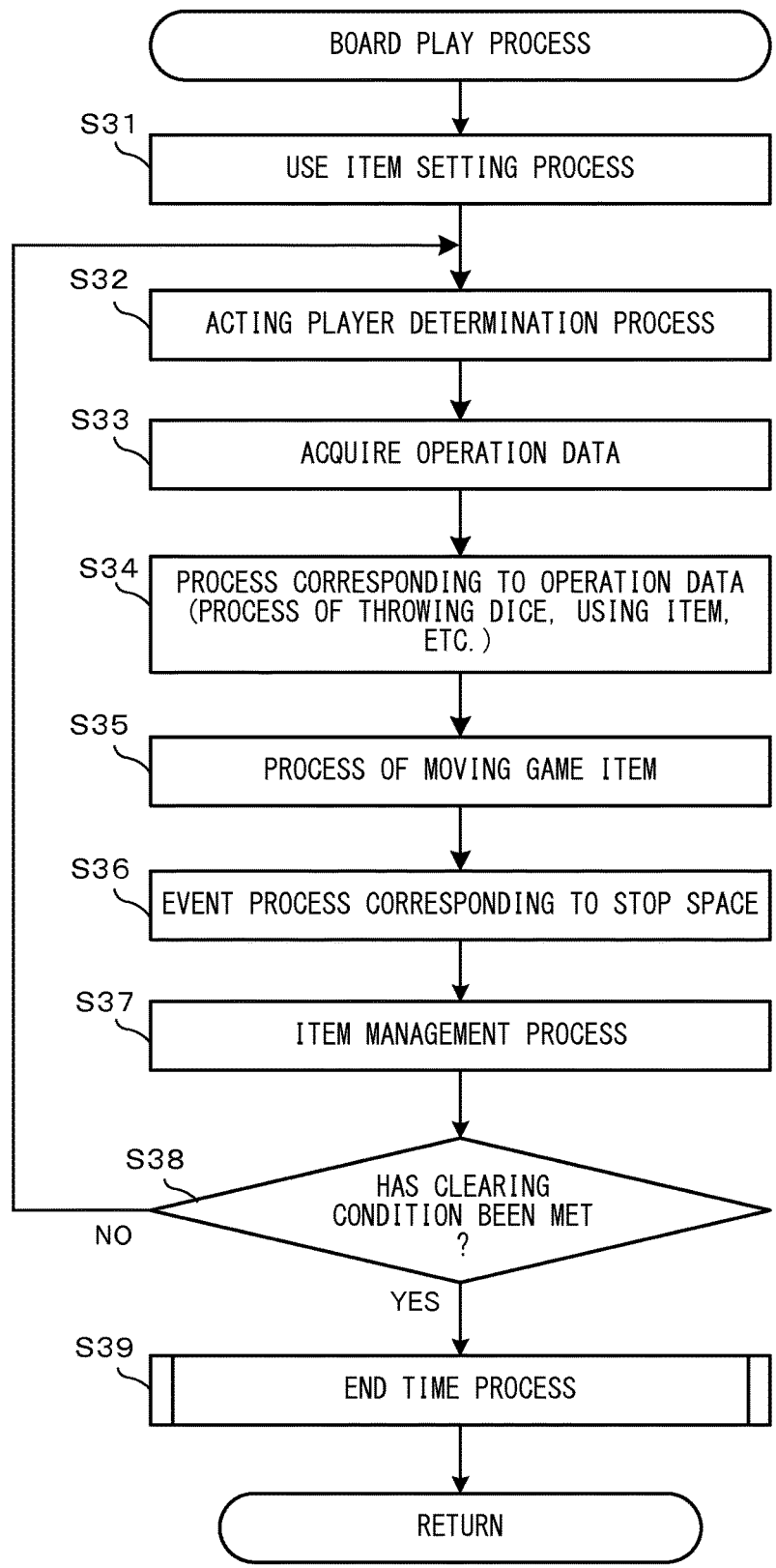
FIG. 23 is a flowchart showing details of a non-limiting example of a board play process regarding step S5 in FIG. 21.

Referring back to FIG. 21, next, in step S5, the processor 10 performs a board play process. FIG. 23 is a flowchart showing details of the board play process. First, in step S31, the processor 10 performs a process of causing a use item, which is to be used by each participating player during play, to be set. For example, the processor 10 displays a predetermined message and screen and accepts an operation of setting a use item which operation is performed by each player. Then, the processor 10 sets the use item for each participating player on the basis of the operation, and stores the set content as a part of the participating player data 206. Thereafter, a game piece of each player is located at a start point, and a message or the like indicating game start is displayed as appropriate.

Next, in step S32, the processor 10 performs a process of determining a participating player to whom a turn to act next has come, among the participating players. Subsequently, in step S33, the processor 10 acquires the operation data 205 regarding the player to whom the turn has come. Then, in subsequent step S34, the processor 10 performs a process corresponding to the acquired operation data, as appropriate. Examples of this process include the following processes: a process of throwing a dice; and a process of using the above-described item. Here, in the case of the item using process, for example, a process is also performed in which a medal indicating the used item is generated on the screen as appropriate and displayed on a space where the game piece of the player is present, as described above.

Next, in step S35, the processor 10 performs a process of moving the game piece of the player to whom the turn has come. That is, a process of moving the game piece forward by a predetermined number of spaces in accordance with the number obtained when the dice is thrown.

Next, in step S36, the processor 10 performs an event process corresponding to the space at which the game piece of the player to whom the turn has come stops. For example, a display in which the game piece of the player enters the event object 103 is performed, and an event process corresponding to the event object 103 is performed as appropriate.

Next, in step S37, the processor 10 performs an item management process. For example, when the medal indicating the item as described above is picked up by (the game piece of) any player, the processor 10 refers to the participating player data 206 regarding the player who has picked up the medal, and updates the item data as appropriate. In addition, when movement of the item between the players occurs as a result of the predetermined event process, the processor 10 updates the item data of each player such that the item data indicates a state after the movement. That is, a movement state of the item during play is temporarily stored in the main memory 11.

Next, in step S38, the processor 10 determines whether a clearing condition for board play has been met. As a result, if the clearing condition has not been met yet (NO in step S38), the processor 10 returns to step S32 to repeat the processes. On the other hand, if the clearing condition has been met (YES in step S38), the processor 10 performs an end time process. In this process, a display of a result announcement screen and a process of writing the memory map and the like into the dedicated FIG. 9 are performed.

Figure 24:
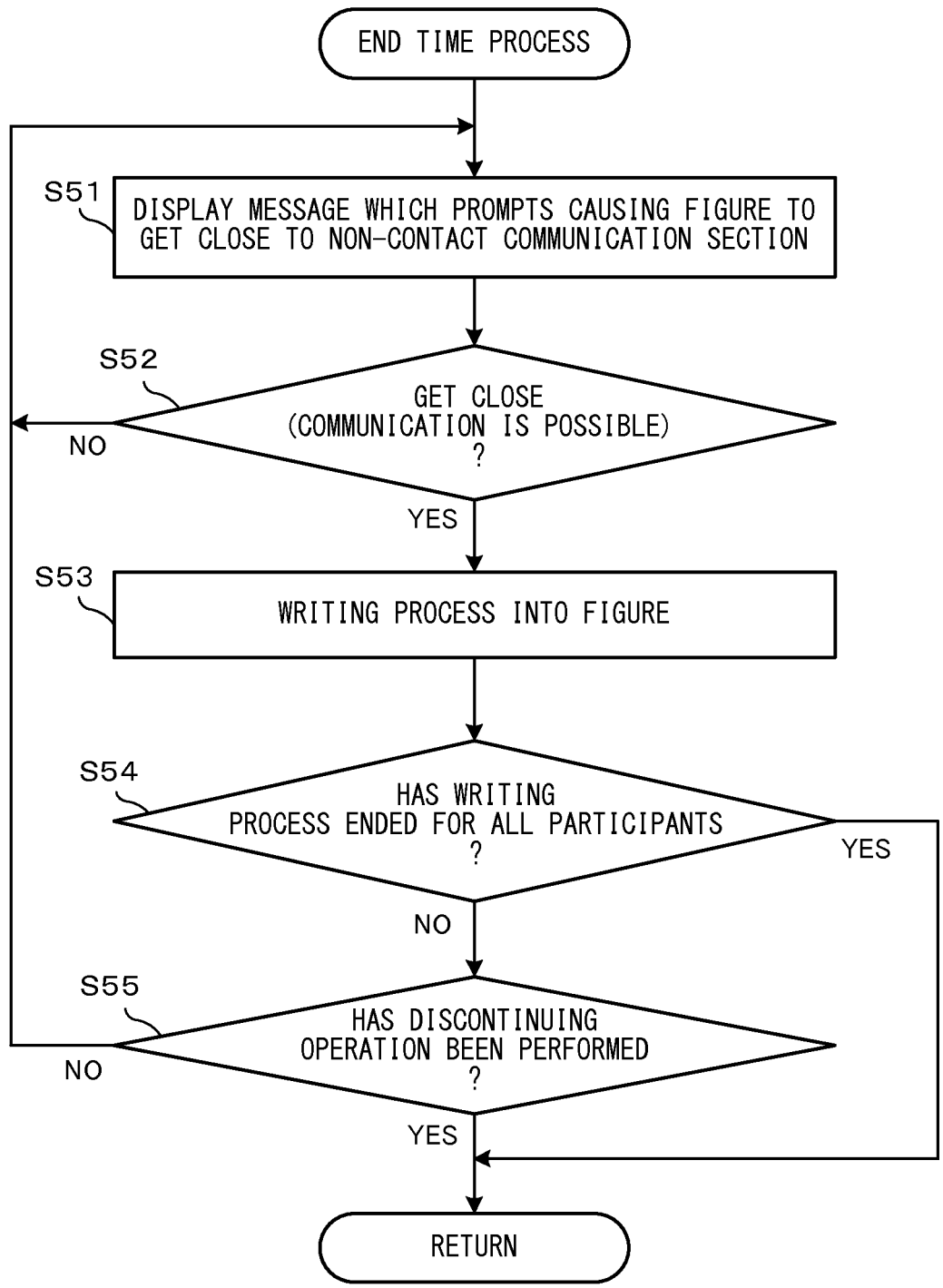
FIG. 24 is a flowchart showing details of a non-limiting example of an end time process regarding step S39 in FIG. 23.

FIG. 24 is a flowchart showing details of the end time process. First, after a screen indicating a game result, such as a ranking announcement screen, is displayed as appropriate, the processor 10 displays a message which prompts each participating player to cause the dedicated FIG. 9 to get close to the terminal device 5 in step S51. For example, a message, "Player A, please pass your figure over game pad" is displayed.

Next, in step S52, the processor 10 determines whether the dedicated FIG. 9 has been caused to get close to the terminal device 5 within a predetermined time period (more properly, whether the dedicated FIG. 9 has come to a state where communication with the non-contact communication section 82 is possible), on the basis of the operation data 205. Then, if the dedicated FIG. 9 has not been caused to get close (NO in step S52), the processor 10 returns to the process in step S51. If the dedicated FIG. 9 has been caused to get close (Yes in step S52), the processor 10 performs a process of writing into the dedicated figure in step S53. Specifically, the processor 10 identifies the corresponding participating player on the basis of the participating player data 206 and the figure type ID 151 of the touched dedicated FIG. 9, and performs a process of writing the item data into the dedicated FIG. 9. Furthermore, the processor 10 also performs a process of writing the contents of the board map data 204 into the memory map data 152.

Next, in step S54, the processor 10 determines whether the process of writing into the figure has ended for all the participating players. As a result, if the process has not ended yet (NO in step S54), the processor 10 determines whether an operation for discontinuing the writing process has been performed in subsequent step S55. The discontinuing operation is performed, for example, when writing of the memory map and the like has been performed for three players among the four participating players but the last player has refused to touch with the dedicated figure. In this case, for the last player, the board map used for playing at that time is not stored as the "memory map" in the dedicated FIG. 9. As a result of the above determination, if the discontinuing operation has not been performed (NO in step S55), the processor 10 returns to step S51 to repeat the above processes on the participating player for which the writing process has not been performed. If the discontinuing operation has been performed (YES in step S55), the end time process ends. In addition, if it is determined in step S54 that the writing has ended for all the players (YES in step S54), the end time process ends.

Referring back to FIG. 23, when the end time process ends, the board play process also ends.

Referring back to FIG. 21, next to the board play process, in step S6, the processor 10 determines whether to end the game processing according to the present embodiment. As a result, if the game processing is not to be ended (NO in step S6), the processor 10 returns to step S2 to repeat the processes. The processor 10 may be configured to return to step S5 when the players desire to play with the same map again. On the other hand, if the game processing is to be ended (YES in step S6), the game processing according to the present embodiment ends.

Next, a process performed if the "normal map" has not been selected (NO in step S3) as a result of the determination in step S3 will be described. In this case, in step S7, the processor 10 determines whether the "memory map" has been selected. As a result, if the "memory map" has been selected (YES in step S7), the processor 10 performs a memory map preparation process in step S8. In this process, a process of reading the "memory map" and setting the "memory map" as a board map is performed.

Figure 25:
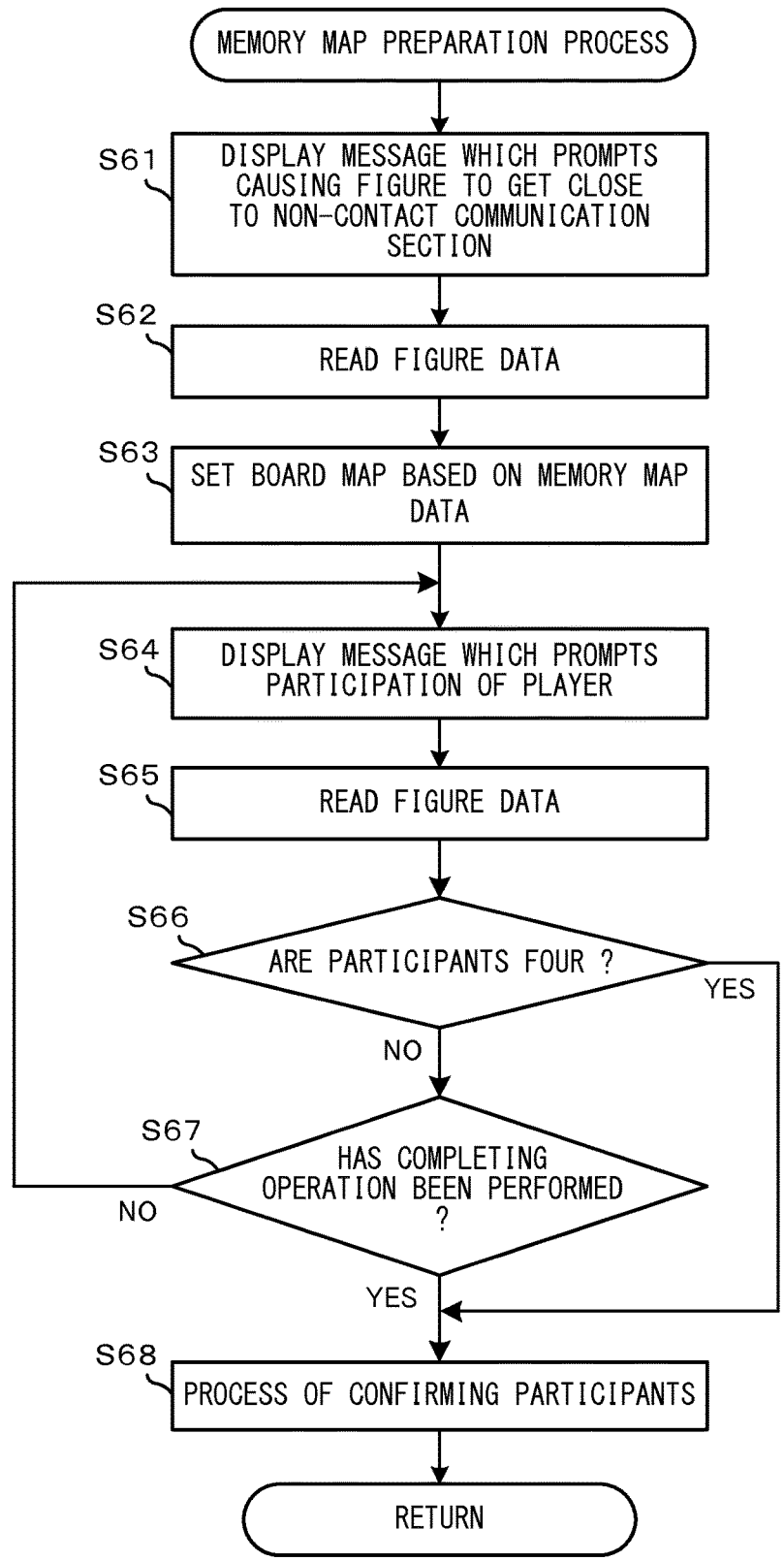
FIG. 25 is a flowchart showing details of a non-limiting example of a memory map preparation process regarding step S8 in FIG. 21.

FIG. 25 is a flowchart showing details of the memory map preparation process. First, in step S61, a message which prompts causing the dedicated figure, which is desired to read the memory map, to get close to the terminal device 5 is displayed. When the player causes the dedicated FIG. 9 to get close to the terminal device 5 in response to this, the processor 10 next reads the memory map data 152 stored in dedicated FIG. 9, in step S62. Next, in step S63, the board map data 204 is set on the basis of the memory map data 152, and is stored.

Next, the processor 10 performs a process for entry of a participating player. First, in step S64, the processor 10 displays a message which prompts entry. When the player causes the dedicated FIG. 9 to get close to the terminal device 5 in response to this, the processor 10 next reads the dedicated figure data from the dedicated FIG. 9 caused to get close, and stores the dedicated figure data in the participating player data 206, in step S65. In subsequent step S66, the processor 10 determines whether the participants are four. As a result, if the participants are still less than four (NO in step S66), the processor 10 refers to the operation data 205 and determines whether an operation of completing participant entry has been performed, in step S67. As a result, if the completing operation has not been performed yet (NO in step S67), the processor 10 returns to step S64 to repeat the processes. On the other hand, if the completing operation has been performed (that is, corresponding to the case where three or fewer players play), the processor 10 performs a process for confirming the participating players (e.g., displays a screen indicating entry completion) in step S68. In addition, if it is determined in step S66 that the participants are four (YES in step S66), the processor 10 skips the process in step S67 and proceeds to the process in step S68. This is the end of the memory map preparation process.

Referring back to FIG. 21, when the memory map preparation process ends, the processor 10 proceeds to step S5 to perform the board play process using the "memory map". Here, in the case of board play using the "memory map", regarding the writing into the dedicated FIG. 9 in the end time process, writing of the "memory map" may not be performed (as a matter of course, the "memory map" may be written similarly to the above). For example, when the player A and a player E who is different from any of the four players play with the "memory map", the "memory map" may not be written into a dedicated figure E possessed by the player E, or may be written into the dedicated figure E. In the case where the "memory map" is written into the dedicated figure E, it is possible for the player E to store the data in the dedicated FIGS. 9A to 9D, into the dedicated figure E possessed by the player E, and use the data.

On the other hand, as a result of the determination in step S7, if the "memory map" also has not been selected (NO in step S7), the processor 10 performs an other map preparation process as appropriate on the basis of the selected content in step S9. For example, when the "trial map" has been selected, a board map is set on the basis of the map data. Then, the processing proceeds to step S5.

This is the end of the detailed description of the game processing according to the present embodiment.

As described above, in the present embodiment, it is possible to store the "memory map" generated on the basis of the data stored in the dedicated FIGS. 9A to 9D, into each dedicated FIG. 9. In other words, it is possible to store the data (the figure type ID 151 in the above example) in the dedicated FIG. 9 of another person, into the own dedicated FIG. 9. Then, when play is performed later, it is possible to play with the "memory map" even without reading the data in the plurality of dedicated FIG. 9. In addition, it is possible to move the item data between the plurality of dedicated FIG. 9. Thus, it is possible to improve the convenience of reading and writing of data by using non-contact communication.

In the embodiment described above, the case where the number of "memory maps" that can be stored in the dedicated FIG. 9 is one has been described as an example. In another embodiment, a plurality of memory maps may be able to be stored.

Regarding generation of the board map, the player selects the "normal map" on the map setting screen and the data in the dedicated figure is read in the above-described example. The board map generation method is not limited to such a generation method, and in another embodiment, for example, when the "normal map" is selected, an "initial map" which is prepared beforehand may be displayed on the screen. Then, as described above, by reading the data in the dedicated figure, each part of the "initial map" may be replaced with that of the unique map, thereby generating a board map.

Regarding the dedicated FIG. 9 which is a storage medium, there are necessarily no limitations to the "figure" as described above. In another embodiment, for example, media including an IC tag as described above, such as an IC card and a medal, may be used (in other words, different types of media may be used). In this case, each of the IC card and the medal may represent a predetermined character or have an appearance by which a predetermined character is identifiable. Furthermore, there are no limitations to the game apparatus, and portable information processing terminals capable of performing non-contact communication as described above, such as a smartphone and a tablet, may be used.

Regarding the combination of storage media on which reading and writing are to be performed, the example of reading and writing between the dedicated FIG. 9 has been descried in the above embodiment, but the combination is not limited thereto. For example, a dedicated figure and a dedicated card which are capable of performing non-contact communication complying with the same standard or a dedicated figure and a dedicated medal which are capable of performing non-contact communication complying with the same standard may be used in combination. In addition, for example, media which perform the same non-contact communication but have different communication standards may be able to be used in combination. For example, a process of reading and writing of data as described above may be performed between a dedicated figure complying with ISO/IEC18092 standard and a dedicated card complying with ISO/IEC21481 standard.

Regarding the item data, data indicating possession/non-possession of the item is retained in the above example. In another embodiment, a parameter having a growth factor for each item may be retained. For example, the item may be a "weapon" item, and a process of increasing a parameter of "attacking power" each time the "weapon" item is used may be performed. In addition, if a sufficient storage capacity can be ensured in the storage section of the IC tag 90, for example, unique item image data may be stored therein.

In the embodiment described above, the timing of end of play with the board map is taken as an example of the timing of writing the "memory map" into the dedicated FIG. 9. The timing is not limited thereto. In another embodiment, for example, the "memory map" may be written at the timing after generation of a board map and before start of play with the board map. In addition, the specific timing may be any timing as long as a process of reading, using, and writing the data from the dedicated FIG. 9 or the like is not performed as a part of the game processing while the game processing as described above (a predetermined application) is executed.

The processing in the embodiment described above is applicable to other game processing, in addition to the party game processing described above. For example, the processing in the embodiment described above is applicable to the case of item exchange in a role-playing game or the like. In addition, the processing in the embodiment described above is also applicable to other information processing, in addition to the game processing. For example, the processing in the embodiment described above is applicable to a process of reading and writing workbook data by using non-contact communication in educational software.

In the embodiment described above, the game system 1 including the terminal device 5 which communicates with the dedicated FIG. 9 by using non-contact communication and the game apparatus 3 equipped with the processor 10 which performs the game processing, is taken as an example. As a matter of course, it is needless to say that the game apparatus 3 itself may be configured to include a non-contact communication section and the processing described above may be applied thereto. For example, the processing described above may be applied to a portable game apparatus including a non-contact communication section.

In the embodiment described above, the game processing is performed in the single game apparatus 3. In another embodiment, the series of processes described above may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

While the exemplary embodiments have been described in detail, the foregoing description is in all aspects illustrative and not restrictive. It is understood that numerous other modifications and variations can be devised without departing from the scope of the exemplary embodiments.

What is claimed is:

1. An information processing apparatus which performs wireless non-contact communication with data storage media having non-contact communication functions and performs predetermined information processing, the information processing apparatus comprising:
    wireless non-contact communication hardware configured to perform non-contact communication with the data storage media;
    a data acquisition circuit operatively connected to the wireless non-contact communication hardware, the data acquisition circuit configured to acquire (a) first data stored in a first data storage medium and (b) second data stored in a second data storage medium by using non-contact communications with the first and second storage media;
    an information processor configured to perform information processing based on the first data and/or the second data; and
    a data writer operatively connected to the wireless non-contact communication hardware, the data writer configured to use non-contact communication by the non-contact communication hardware to write the first data into the second data storage medium or write the second data into the first data storage medium.

2. The information processing apparatus according to claim 1, wherein the first data storage medium and the second data storage medium are different types of storage media.

3. The information processing apparatus according to claim 2, wherein the first data storage medium and the second data storage medium are storage media which have the same communication standard for the non-contact communication but have appearances different from each other.

4. The information processing apparatus according to claim 2, wherein the first data storage medium and the second data storage medium are storage media which have different communication standards for the non-contact communication.

5. The information processing apparatus according to claim 1, wherein the information processor reads the second data from the first data storage medium or reads the first data from the second data storage medium, and performs information processing based on the read first data or the read second data.

6. The information processing apparatus according to claim 5, wherein the information processor reads both the first data and the second data from the first data storage medium or the second data storage medium and performs information processing based on the read first data and second data.

7. The information processing apparatus according to claim 1, wherein the data writer writes the first data into the second data storage medium or writes the second data into the first data storage medium after the predetermined information processing based on the first data and/or the second data ends.

8. The information processing apparatus according to claim 1, wherein the data storage medium is a media having an appearance by which a predetermined character is identifiable.

9. The information processing apparatus according to claim 8, wherein unique data associated with the predetermined character is stored as the first data or the second data in the data storage medium.

10. The information processing apparatus according to claim 1, wherein
the information processor includes a third data generation section configured to combine the first data and the second data to generate third data, and
the data writer writes the third data into the first data storage medium or writes the third data into the second data storage medium.

11. The information processing apparatus according to claim 1, wherein the processing in the data acquisition circuit, the information processor, and the data writer is performed while predetermined application processing is performed.

12. The information processing apparatus according to claim 11, wherein the predetermined application processing is game processing.

13. The information processing apparatus according to claim 1, wherein the non-contact communication is communication using an IC tag.

14. The information processing apparatus according to claim 1, wherein
the data acquisition circuit acquires, from a third data storage medium in which third data is stored, the third data,
the information processor performs processing based on the first data, the second data, and the third data, and
the data writer writes the first data and the third data into the second data storage medium or writes the second data and the third data into the first data storage medium.

15. The information processing apparatus according to claim 1, wherein the first and second data storage media are each disposed in a respective portable handheld housing containing a non-contact wireless transceiver.

16. An information processing system which performs wireless non-contact communication with data storage media having non-contact communication functions and performs predetermined information processing, the information processing system comprising:
wireless non-contact communication hardware configured to perform non-contact communication with the data storage media;
a data acquisition circuit operatively connected to the wireless non-contact communication hardware, the data acquisition circuit configured to acquire (a) first data stored in a first data storage medium and (b) second data stored in a second data storage medium by using non-contact communications with the first and second storage media;
an information processor configured to perform information processing based on the first data and/or the second data; and
a data writer operatively connected to the wireless non-contact communication hardware, the data writer configured to use non-contact communication by the non-contact communication hardware to write the first data into the second data storage medium or write the second data into the first data storage medium.

17. The information processing system according to claim 16, wherein the first and second data storage media are each disposed in a respective portable handheld housing containing a non-contact wireless transceiver.

18. A computer-readable non-transitory storage medium having stored therein an information processing program executed by a computer of an information processing apparatus which performs wireless non-contact communication with data storage media having non-contact communication functions and performs predetermined information processing, the information processing program causing the computer to function as:
a wireless non-contact communicator configured to use non-contact communications hardware to perform non-contact communication with the data storage media;
a data acquisition circuit operatively connected to the wireless non-contact communication hardware, the data acquisition circuit configured to acquire (a) first data stored in a first data storage medium and (b) second data stored in a second data storage medium by using non-contact communications with the first and second storage media;
an information processor configured to perform information processing based on the first data and/or the second data; and
a data writer operatively connected to the wireless non-contact communication hardware, the data writer configured to use non-contact communication by the non-contact communication hardware to write the first data into the second data storage medium or write the second data into the first data storage medium.

19. The computer-readable non-transitory storage medium according to claim 18, wherein the first and second data storage media are each disposed in a respective portable handheld housing containing a non-contact wireless transceiver.

20. An information processing method for controlling a computer of an information processing apparatus which performs wireless non-contact communication with data storage media having non-contact communication functions and performs predetermined information processing, the information processing method comprising the steps of:
   using non-contact communications hardware to perform non-contact communication with the data storage media;
   acquiring first data stored in a first data storage medium and second data stored in a second data storage medium by using non-contact communications with the first and second storage media;
   performing information processing based on the first data and/or the second data; and
   writing the first data into the second data storage medium or writing the second data into the first data storage medium.

21. The information processing method according to claim 20, wherein the first and second data storage media are each disposed in a respective portable handheld housing containing a non-contact wireless transceiver.

* * * * *